US012587917B2

(12) United States Patent
Fu et al.

(10) Patent No.: US 12,587,917 B2
(45) Date of Patent: Mar. 24, 2026

(54) MANAGEMENT METHOD, DEVICE AND STORAGE MEDIUM FOR CELL HANDOVER

(71) Applicant: InterDigital Patent Holdings, Inc., Wilmington, DE (US)

(72) Inventors: Zhe Fu, Guangdong (CN); Jianhua Liu, Guangdong (CN)

(73) Assignee: InterDigital Patent Holdings, Inc., Wilmington, DE (US)

( * ) Notice: Subject to any disclaimer, the term of this patent is extended or adjusted under 35 U.S.C. 154(b) by 354 days.

(21) Appl. No.: 17/731,842

(22) Filed: Apr. 28, 2022

(65) Prior Publication Data

US 2022/0256408 A1 Aug. 11, 2022

Related U.S. Application Data

(63) Continuation of application No. PCT/CN2019/114398, filed on Oct. 30, 2019.

(51) Int. Cl.
 *H04W 36/00* (2009.01)
 *H04W 36/08* (2009.01)
 (Continued)

(52) U.S. Cl.
 CPC ... *H04W 36/0079* (2018.08); *H04W 36/0055* (2013.01); *H04W 36/0064* (2023.05);
 (Continued)

(58) Field of Classification Search
 CPC ......... H04W 36/0055; H04W 36/0079; H04W 36/08; H04W 56/001; H04W 36/0064;
 (Continued)

(56) References Cited

U.S. PATENT DOCUMENTS

2009/0137250 A1* 5/2009 Kurimoto ........... H04W 36/324
                                                    455/436
2013/0235844 A1* 9/2013 Ge .................. H04W 36/00692
                                                    370/331
(Continued)

FOREIGN PATENT DOCUMENTS

CN        102868488 A  * 1/2013
CN        103916880 A    7/2014
         (Continued)

OTHER PUBLICATIONS

International Search Report (ISR) dated Jul. 21, 2020 for Application No. PCT/CN2019/114398.

(Continued)

*Primary Examiner* — Atique Ahmed
(74) *Attorney, Agent, or Firm* — Volpe Koenig

(57) ABSTRACT

Embodiments of the present application provide a management method, device and storage medium for cell handover. When the terminal device needs to be handed over from a source cell to another cell, a network device in the source cell determines, according to reference clock information received from a designated node, a target cell that meets a preset condition, and further, hands over the terminal device from the source cell to the target cell, where the preset condition may be a preset condition meeting TSN or TSC clock requirements; in other words, when the target cell meets the TSN or TSC clock requirements, the terminal device can be handed over from the source cell to the target cell.

20 Claims, 12 Drawing Sheets

100

(51) Int. Cl.
    *H04W 36/24*        (2009.01)
    *H04W 56/00*        (2009.01)

(52) U.S. Cl.
    CPC ......... *H04W 36/08* (2013.01); *H04W 36/249*
         (2023.05); *H04W 56/001* (2013.01)

(58) Field of Classification Search
    CPC ........................... H04W 36/249; H04W 40/36;
         H04L 47/2416; H04L 47/283; H04L
         40/36
    See application file for complete search history.

(56) References Cited

U.S. PATENT DOCUMENTS

| | | | |
|---|---|---|---|
| 2015/0358865 A1* | 12/2015 | Fu | H04W 36/0033 |
| | | | 455/436 |
| 2016/0021594 A1* | 1/2016 | Yilmaz | H04W 8/005 |
| | | | 370/332 |
| 2018/0020472 A1* | 1/2018 | Lin | H04W 56/00 |
| 2018/0167849 A1* | 6/2018 | Wang | H04W 36/0016 |
| 2018/0359666 A1* | 12/2018 | Wang | H04W 56/00 |
| 2020/0229124 A1* | 7/2020 | Soriaga | H04W 4/023 |
| 2020/0259896 A1* | 8/2020 | Sachs | H04L 63/0428 |
| 2020/0413360 A1* | 12/2020 | Ruffini | H04W 56/0015 |
| 2022/0132460 A1* | 4/2022 | Shimoda | H04W 64/003 |
| 2022/0182165 A1* | 6/2022 | Sha | H04J 3/0685 |

FOREIGN PATENT DOCUMENTS

| | | |
|---|---|---|
| CN | 103945521 A | 7/2014 |
| CN | 110072258 A | 7/2019 |
| EP | 1890398 A1 | 2/2008 |
| EP | 1890398 A9 | 2/2008 |
| WO | 2018230997 A1 | 12/2018 |
| WO | 2019134163 A1 | 7/2019 |

OTHER PUBLICATIONS

Nokia, Nokia Shanghai Bell, NR support for TSN traffic patterns, R2-1817270 01, Nov. 2018.

The EESR of corresponding European application application No. 19950532.2 dated on Oct. 6, 2022.

Anonymous, 3rd Generation Partnership Project;Technical Specification Group Services and System Aspects;System Architecture for the 5G System(5GS);Stage 2(Release 16), XP051784669, 3GPP TS 23.501 V16.2.0,France, Sep. 24, 2019.

Anonymous,LTE Quick Reference—Subframe Number,SFN and HFN,XP005961887, Oct. 23, 2019.

* cited by examiner

MANAGEMENT METHOD, DEVICE AND STORAGE MEDIUM FOR CELL HANDOVER

CROSS-REFERENCE TO RELATED APPLICATIONS

This application is a continuation of International Application No. PCT/CN2019/114398, filed on Oct. 30, 2019, which is hereby incorporated by reference in its entirety.

TECHNICAL FIELD

Embodiments of the present application relate to communication technologies, and in particular, to a management method, device and storage medium for cell handover.

BACKGROUND

In the 5G Industrial Internet Of Things (IIoT), the 5G communication system can be used for services such as Factory automation, Transport Industry, and Electrical Power Distribution. Since these services have high requirements for low latency and reliable transmission, the concept of Time Sensitive Networking (TSN) or Time Sensitive Conveying (TSC) is introduced into IIoT.

In order to meet the requirements of TSN service or TSC service for low latency and reliable transmission, the 5G communication system is required to provide lower latency guarantee and higher time synchronization accuracy. And in the 5G communication system, the terminal device may be handed over from one cell (a source cell) to another cell (a target cell). If the target cell cannot meet the higher time synchronization accuracy, the latency of the TSN service or the TSC service transmitted by the terminal device will be caused to be higher, or the quality of service (QoS) of the TSN service or the TSC service transmitted by the terminal device will be caused to decrease.

SUMMARY

The embodiments of the present application provide a management method, device and storage medium for cell handover, so as to avoid the problem that when a terminal device is randomly handed over to a target cell and the target cell does not meet the TSN or TSC clock requirements, the latency of the TSN service or the TSC service is caused to increase or the QoS is caused to decrease.

According to a first aspect, an embodiment of the present application may provide a management method for cell handover, including:

receiving, by a first communication node, reference clock information from a designated node;

determining, by the first communication node, according to the reference clock information, a target cell that meets a preset condition, and initiating a handover process of handing over a second communication node from a source cell to the target cell, where the second communication node is connected to the first communication node, and the first communication node belongs to the source cell.

According to a second aspect, an embodiment of the present application may provide a management method for cell handover, including:

sending, by a network device corresponding to a candidate cell, reference clock information to a first communication node, where the reference clock information is used for the first communication node to determine a target cell that meets a preset condition and initiate a handover process of handing over a second communication node from a source cell to the target cell, where the second communication node is connected to the first communication node, and the first communication node belongs to the source cell.

According to a third aspect, an embodiment of the present application may provide a management method for cell handover, including:

sending, by a terminal device, reference clock information to a first communication node, where the reference clock information is used for the first communication node to determine a target cell that meets a preset condition and initiate a handover process of handing over a second communication node from a source cell to the target cell, where the second communication node is connected to the first communication node, and the first communication node belongs to the source cell.

According to a fourth aspect, an embodiment of the present application may provide a management method for cell handover, including:

detecting, by a first communication node, locally saved reference clock information; and/or sending, by the first communication node, a first request message to a third communication node, where the first request message is used to request the third communication node to feed back reference clock information;

determining, by the first communication node, according to the acquired reference clock information, a target cell that meets a preset condition, and initiating a handover process of handing over a second communication node from a source cell to the target cell, where the first communication node belongs to the source cell, and the second communication node is connected to the first communication node.

According to a fifth aspect, an embodiment of the present application may provide a management method for cell handover, including:

receiving, by a third communication node, a first request message sent by a first communication node, where the first request message is used to request the third communication node to feed back reference clock information, and the reference clock information is used for the first communication node to determine a target cell that meets a preset condition and initiate a handover process of handing over a second communication node from a source cell to the target cell, where the first communication node belongs to the source cell, and the second communication node is connected to the first communication node.

According to a sixth aspect, an embodiment of the present application may provide a first communication node, including:

a receiving module, configured to receive reference clock information from a designated node;

a determination module, configured to determine, according to the reference clock information, a target cell that meets a preset condition, and initiate a handover process of handing over a second communication node from a source cell to the target cell, where the second communication node is connected to the first communication node, and the first communication node belongs to the source cell.

According to a seventh aspect, an embodiment of the present application may provide a network device corresponding to a candidate cell, including:

a determination module, configured to determine reference clock information sent to a first communication node;

a transmission module, configured to send the reference clock information to the first communication node, where the reference clock information is used for the first communication node to determine a target cell that meets a preset condition and initiate a handover process of handing over a second communication node from a source cell to the target cell, where the second communication node is connected to the first communication node, and the first communication node belongs to the source cell.

According to an eighth aspect, an embodiment of the present application may provide a terminal device, including:

a determination module, configured to determine reference clock information sent to a first communication node;

a transmission module, configured to send the reference clock information to the first communication node, where the reference clock information is used for the first communication node to determine a target cell that meets a preset condition and initiate a handover process of handing over a second communication node from a source cell to the target cell, where the second communication node is connected to the first communication node, and the first communication node belongs to the source cell.

According to a ninth aspect, an embodiment of the present application may provide a first communication node, including: a detection module and/or a transmission module, and a determination module; where, the detection module is configured to detect locally saved reference clock information;

the transmission module is configured to send a first request message to a third communication node, where the first request message is used to request the third communication node to feed back reference clock information;

the determination module is configured to determine, according to the acquired reference clock information, a target cell that meets a preset condition, and initiate a handover process of handing over a second communication node from a source cell to the target cell, where the first communication node belongs to the source cell, and the second communication node is connected to the first communication node.

According to a tenth aspect, an embodiment of the present application may provide a third communication node, including:

a receiving module, configured to receive a first request message sent by a first communication node, where the first request message is used to request the third communication node to feed back reference clock information, where the reference clock information is used for the first communication node to determine a target cell that meets a preset condition and initiate a handover process of handing over a second communication node from a source cell to the target cell, where the first communication node belongs to the source cell, and the second communication node is connected to the first communication node;

a transmission module, configured to send the feedback reference clock information to the first communication node.

According to an eleventh aspect, an embodiment of the present application may provide a first communication node, including:

a processor, a memory and a communication interface; where the memory stores computer-executable instructions;

the processor executes the computer executed instructions stored in the memory, causing the processor to perform the management method for cell handover according to the first aspect or the fourth aspect.

According to a twelfth aspect, an embodiment of the present application may provide a network device corresponding to a candidate cell, including:

a processor, a memory and a communication interface; where the memory stores computer-executable instructions;

the processor executes the computer-executable instructions stored in the memory, causing the processor to perform the management method for cell handover according to the second aspect.

According to a thirteenth aspect, an embodiment of the present application may provide a terminal device, including:

a processor, a memory and a communication interface; where the memory stores computer-executable instructions;

the processor executes the computer-executable instructions stored in the memory, causing the processor to perform the management method for cell handover according to the third aspect.

According to a fourteenth aspect, an embodiment of the present application may provide a third communication node, including:

a processor, a memory and a communication interface; where the memory stores computer-executable instructions;

the processor executes the computer-executable instructions stored in the memory, causing the processor to perform the management method for cell handover according to the fifth aspect.

According to a fifteenth aspect, an embodiment of the present application provides a computer-readable storage medium, where the computer-readable storage medium has computer-executable instructions stored thereon, and when executed by a processor, the computer-executable instructions are used to implement the management method for cell handover according to the first aspect, the second aspect, the third aspect, the fourth aspect, or the fifth aspect.

According to a sixteenth aspect, an embodiment of the present application provides a chip, including: a processor, configured to call and run a computer program from a memory, causing a device installed with the chip to perform the management method for cell handover according to the first aspect, the second aspect, the third aspect, the fourth aspect, or the fifth aspect.

According to a seventeenth aspect, an embodiment of the present application provides a computer program product, including computer program instructions that enable a computer to perform the management method for cell handover according to the first aspect, the second aspect, the third aspect, the fourth aspect or the fifth aspect.

According to an eighteenth aspect, an embodiment of the present application further provides a computer program that enables a computer to perform the management method for cell handover according, to the first aspect, the second aspect, the third aspect, the fourth aspect or the fifth aspect.

According to the management method, device and storage medium for cell handover provided in the embodiments of the present application, in the case that the terminal device needs to be handed over from a source cell to another cell, the network device in the source cell determines, according to the reference clock information received from the designated node, a target cell that meets a preset condition, and further, hands over the terminal device from the source cell to the target cell, where the preset condition may be a preset condition that meets TSN or TSC clock requirements; in other words, in the case that the target cell meets the TSN or TSC clock requirements, the terminal device can be handed over from the source cell to the target cell, which avoids the problem that when the terminal device is randomly handed over to a target cell and the target cell does not meet the TSN or TSC clock requirements, the latency of the TSN service or the TSC service is caused to increase or the QoS is caused to decrease.

BRIEF DESCRIPTION OF THE DRAWINGS

In order to more clearly illustrate the technical solutions in the embodiments of the present application or in the prior art, the following will briefly introduce the accompanying drawings required to use in the description of the embodiments or of the prior art. Obviously, the accompanying drawings in the following description are some embodiments of the present application. For those of ordinary skill in the art, other drawings can further be obtained based on these drawings without paying creative labor.

DESCRIPTION OF EMBODIMENTS

Figures 1, 2:
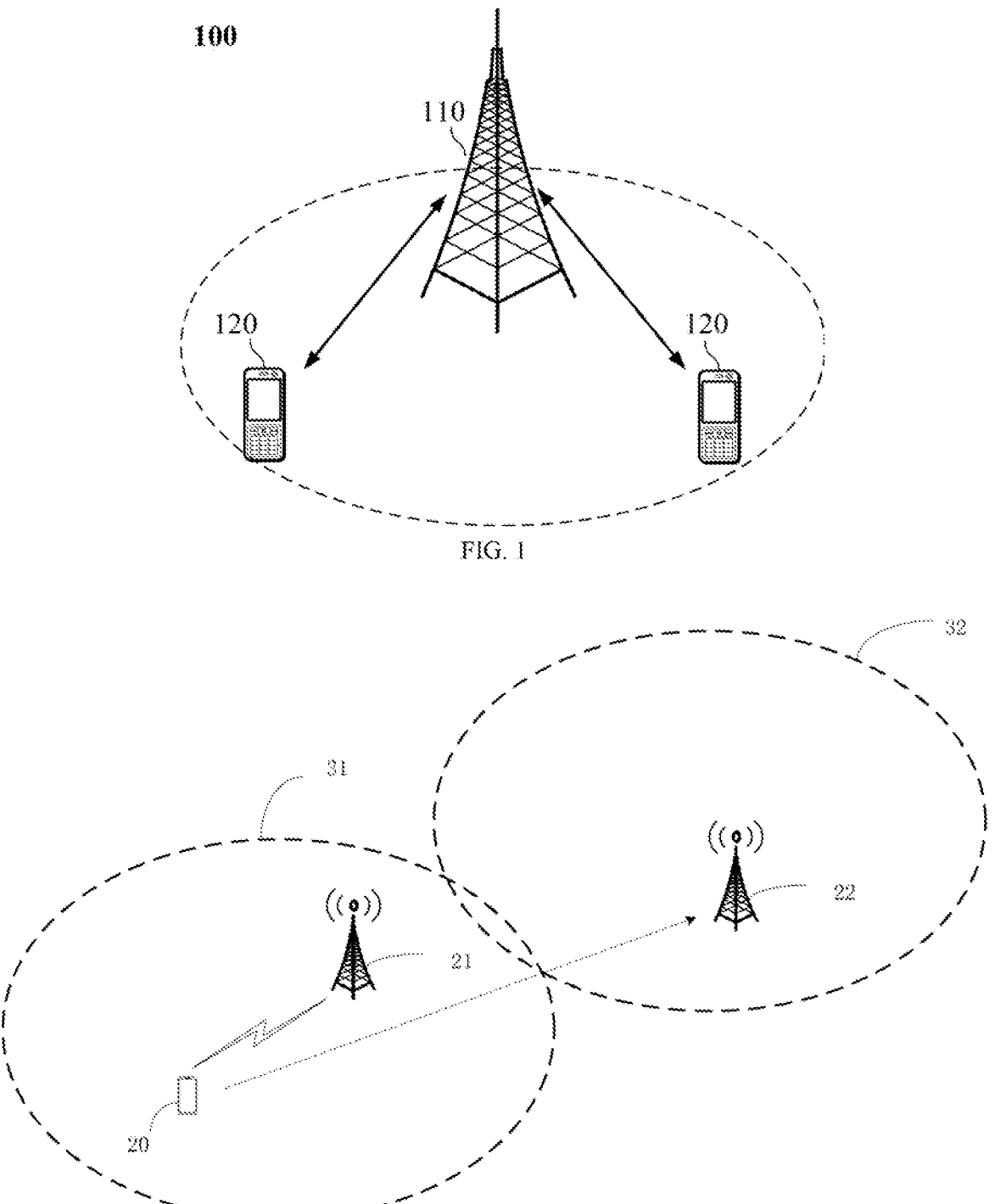
FIG. 1 is a schematic diagram of a communication system provided by the present application.
FIG. 2 is a schematic diagram of another communication system provided by the present application.

In order to make the purpose, technical solutions and advantages of the embodiments of the present application clearer, the technical solutions in the embodiments of the present application will be dearly and completely described below in conjunction with the accompanying drawings in the embodiments of the present application. Apparently, the described embodiments are a part of the embodiments of the present application, rather than all of the embodiments. Based on the embodiments in the present application, all other embodiments obtained by those of ordinary skill in the art without creative work shall fall within the scope of protection of the present application.

The terms "first", "second", etc. in the specification, claims and the above-described accompanying drawings of the embodiments of the present application are used to distinguish similar objects, but are not necessarily used to describe a specific order or sequence. Understandably, the data used in this way can be interchanged in appropriate cases so as to implement the embodiments of the present application described herein in an order, for example, other than those illustrated or described herein. In addition, the terms "include" and "have" and any variations of them are intended to cover non-exclusive inclusions, for example, a process, method, system, product or device including a series of steps or units is not necessarily limited to those steps or units clearly listed, but may include other steps or units that are not clearly listed or are inherent to these processes, methods, products or devices.

Technical solutions in the embodiments of the present application will be described below in conjunction with the accompanying drawings in the embodiments of the present application. Apparently, the described embodiments are a part of the embodiments of the present application, rather than all of the embodiments. Based on the embodiments in the present application, all other embodiments obtained by those of ordinary skill in the art without creative work shall fall within the scope of protection of the present application.

The technical solution of the embodiments of the present application can be applied to various communication systems, such as: Global System of Mobile communication (GSM) system, Code Division Multiple Access (CDMA) system, Wideband Code Division Multiple Access (WCDMA) system, General Packet Radio Service (GPRS), Long Term Evolution (LIE) system, LTE Frequency Division Duplex (FDD) system, LTE Time Division Duplex (TDD) system, Advanced long term evolution (LTE-A) system, New Radio (NR) system, evolution system of NR system, LTE-based access to unlicensed spectrum (LTE-U) system, NR-based access to unlicensed spectrum (NR-U) system, Universal Mobile Telecommunication System (UMTS), Worldwide Interoperability for Microwave Access (WiMAX) communication system, Wireless Local Area Networks (WLAN), Wireless Fidelity (Wi-Fi), Next-generation communication system or other communication systems.

Generally speaking, a traditional communication system supports a limited number of connections, which is easy to implement. However, with development of communication technology, a mobile communication system will not only support traditional communications, but will also support, for example, Device to Device (D2D) communication, Machine to Machine (M2M) communication, Machine Type Communication (MTC) and vehicle to vehicle (V2V) communication, etc., to which the embodiments of the present application can also be applied.

Exemplarily, a communication system 100 applied in an embodiment of the present application is shown in FIG. 1. The communication system 100 may include a network device 110, which can be a device communicating with a terminal device 120 (or called a communication terminal or terminal). The network device 110 can provide communication coverage for a specific geographic area, and can communicate with terminal devices located in the coverage area. In an implementation, the network device 110 may be a Base Transceiver Station (BTS) in a GSM system or a CDMA system, or may be a NodeB (NB) in a WCDMA system, or an Evolutional Node B (eNB or eNodeB) in a LTE system, or a wireless controller in a Cloud Radio Access Network (CRAN), or the network device can be a mobile switching center, a relay station, an access point, an in-vehicle device, a wearable device, a hub, a switch, a bridge, a router, a network side device in a 5G network, or a network device in a Public Land Mobile Network (PLMN) that will evolve in the future.

The communication system 100 further includes at least one terminal device 120 located within the coverage area of the network device 110. The "terminal device" used herein includes, but is not limited to, connection via a wired line, for example, connection via a Public Switched Telephone Network (PSTN), a Digital Subscriber Line (DSL), a digital cable, a direct cable; and/or another data connection/network; and/or via a wireless interface, such as for the cellular network, WLAN, digital TV network such as the DVB-H network, a satellite network, a AM-FM broadcast transmitter; and/or a device of another terminal device that is configured to receive/send communication signals; and/or the Internet of Things (IoT) device. A terminal device set to communicate through a wireless interface may be referred to as a "wireless communication terminal", a "wireless terminal" or a "mobile terminal". Examples of mobile terminals include, but are not limited to, the satellite or cellular phone; a Personal Communications System (PCS) terminal which may combine the cellular radio telephone and data processing, fax and data communication capabilities; it may include a radio phone, a pager, an Internet/Intranet access, a web browser, a notebook, a calendars and/or a Personal Digital Assistant (PDA) device for Global Positioning System (GPS) receiver; as well as a conventional laptop and/or palmtop receiver or other electronic devices including a radio telephone transceiver. The terminal device can refer to an access terminal, a user equipment (UE), a subscriber unit, a subscriber station, a mobile station, a station, a remote station, a remote terminal, a mobile device, a user terminal, a terminal, a wireless communication device, a user agent or a user device. The access terminal can be a cellular phone, a cordless phone, a Session Initiation Protocol (SIP) phone, a Wireless Local Loop (WLL) station, a PDA device, a handheld device with wireless communication capabilities, a computing device or other processing devices connected to a wireless modem, an in-vehicle device, a wearable device, a terminal device in the 5G network or a terminal device in an evolved PLMN in the future, etc.

In an implementation, D2D communication may be performed between the terminal devices 120.

In an implementation, a 5G system may also be referred to as an NR system, or a 5G network may also be referred to as an NR network.

FIG. 1 exemplarily shows one network device and two terminal devices. In an implementation, the communication system 100 can include multiple network devices, and other numbers of terminal devices can be included within the coverage of each network device, which is not limited in the embodiments of the present application.

In FIG. 1, the network device can be an access device, for example, it can be an access device in an NR-U system, for example, a 5G NR base station (next generation Node B, gNB) or a small station, a micro station, it can also be a relay station, a transmission and reception point (TRP), a road side unit (RSU), and so on.

A terminal device may also be referred to as a mobile terminal, a UE, an access terminal, a subscriber unit, a subscriber station, a mobile station, a station, a user terminal, a terminal, a wireless communication device, a user agent or a user device. Specifically, it can be a smart phone, a cellular phone, a cordless phone, a PDA device, a handheld device with wireless communication function or other processing devices connected to a wireless modem, in-vehicle device, a wearable device, etc. In the embodiment of the present application, the terminal device has an interface for communicating with a network device (for example, a cellular network).

In an implementation, the communication system 100 may also include other network entities such as a network controller and a mobility management entity, which are not limited in the embodiment of the present application.

It should be understood that a device with a communication function in the network/system in the embodiment of the present application may be referred to as a communication device. Taking the communication system 100 shown in FIG. 1 as an example, the communication device may include a network device 110 and a terminal device 120 with communication functions, and the network device 110 and the terminal device 120 may be the specific devices described above, which will not be repeated herein; the communication device may also include other devices in the communication system 100, for example, other network entities such as the network controller and mobility management entity, which are not limited in the embodiment of the present application. It should be understood that the terms "system" and "network" are often used interchangeably herein. The term "and/or" used herein is just an association relationship that describes associated objects, indicating that there can be three types of relationships, for example, A and/or B can represent three cases: A exists alone, A and B exist at the same time, and B exists alone. In addition, the character "/" used herein generally indicates that the interrelated objects in the context are of an "or" relationship.

The method of the embodiment of the present application can be applied to the communication system shown in FIG. 1 and can also be applied to other communication scenarios.

It should be noted that the cell involved in the embodiment of the present application is also referred to as a cellular cell, which refers to the area covered by the base station in the a cellular mobile communication system, or by a part of the base station, such as an area covered by a sector antenna. In other words, the cell can be an omnidirectional cell covered by an omnidirectional antenna of the base station, it can also be a sector area covered by a directional antenna of the base station. In the present embodiment, an omnidirectional cell is used as an example for schematic description.

Generally in 5G IIoT, a 5G communication system can be used for transmission industrial automation, transmission automation, smart power and other services, which, however, have higher requirements for low latency and reliable transmission. Therefore, the 5G communication system is required to provide lower latency guarantee and higher time synchronization accuracy. While in the 5G communication system, the terminal device may be handed over from one cell (a source cell) to another cell (a target cell). As shown in FIG. 2, a source base station 21 is a base station to which a terminal device 20 in a source cell 31 is connected. In some scenarios, the terminal device 20 is required to be handed over to another cell, such as a target cell 32. If the source cell 31 is a cell meeting TSN or TSC clock requirements, the terminal device 20 is a terminal device required to transmit or being transmitting a TSN service or a TSC service; while the target cell 32 is a cell that does not meet the TSN or TSC clock requirements, then if the terminal device 20 is handed over from the source cell 31 to the target cell 32, following situations may occur: one possible situation is that after the terminal device is handed over from the source cell 31 to the target cell 32, it is necessary for the terminal device 20 to be handed over to another cell that meets the TSN or TSC clock requirements as soon as possible, which will increase the latency of TSN service or TSC service transmission. Another possible situation is that after the terminal device is handed over from the source cell 31 to the target cell 32, the terminal device 20 cannot continue transmitting the TSN service or the TSC service through a target base station 22 in the target cell 32, which will decrease the QoS of the TSN service or the TSC service in order to solve this problem, this embodiment provides a management method for cell handover, which will be introduced below in conjunction with specific embodiments.

In the following embodiments, a first communication node may be a source network device corresponding to a source cell, for example, a source base station in the source cell. A second communication node may be a terminal device, which may be a terminal device supporting the TSN service or TSC service, or the terminal device may be a terminal device with TSN service or TSC service transmission capability, or the terminal device is performing the TSN service or TSC service transmission, or the terminal device is going to perform the TSN service or TSC service transmission. A third communication node may be at least one of: a core network element, an Operation Administration and Maintenance (OAM) network element, and a Centre Network Control (CNC) network element, where the core network element may specifically be an Access and Mobility Management Function (AMF) entity network element. A fourth communication node may be a target network device corresponding to the target cell, for example, a target base station in the target cell. In addition, in some embodiments, a network device corresponding to a candidate cell may also be recorded as a fifth communication node, where the target cell can be determined among candidate cells. Therefore, when the candidate cell is the target cell, the fourth communication node and the fifth communication node may be the same one. When the candidate cell is not the target cell, the fourth communication node and the fifth communication node may be different communication nodes. In some scenarios, a designated node may be a network device corresponding to at least one candidate cell. In other scenarios, the designated node may be a terminal device.

In addition, the communication system to which the management method for cell handover provided in the embodiments of the present application is applicable may include an OAM network element, a CNC network element, or an AMF network element, or may not include an OAM network element, a CNC network element, or an AMF network element.

When the communication system includes the OAM network element, the CNC network element or the AMF network element, from which the source base station can obtain reference clock information; alternatively, the source base station can also obtain the reference clock information locally; further, according to the reference clock information, a target cell that meets a preset condition is determined, and a handover process of handing over the terminal device from the source cell to the target cell is initiated.

When the communication system does include the OAM network element, the CNC network element or the AMF network element, the source base station can obtain reference clock information from the designated node; according to the reference clock information, a target cell that meets a preset condition is determined, and a handover process of handing over the terminal device from the source cell to the target cell is initiated.

Figure 3:
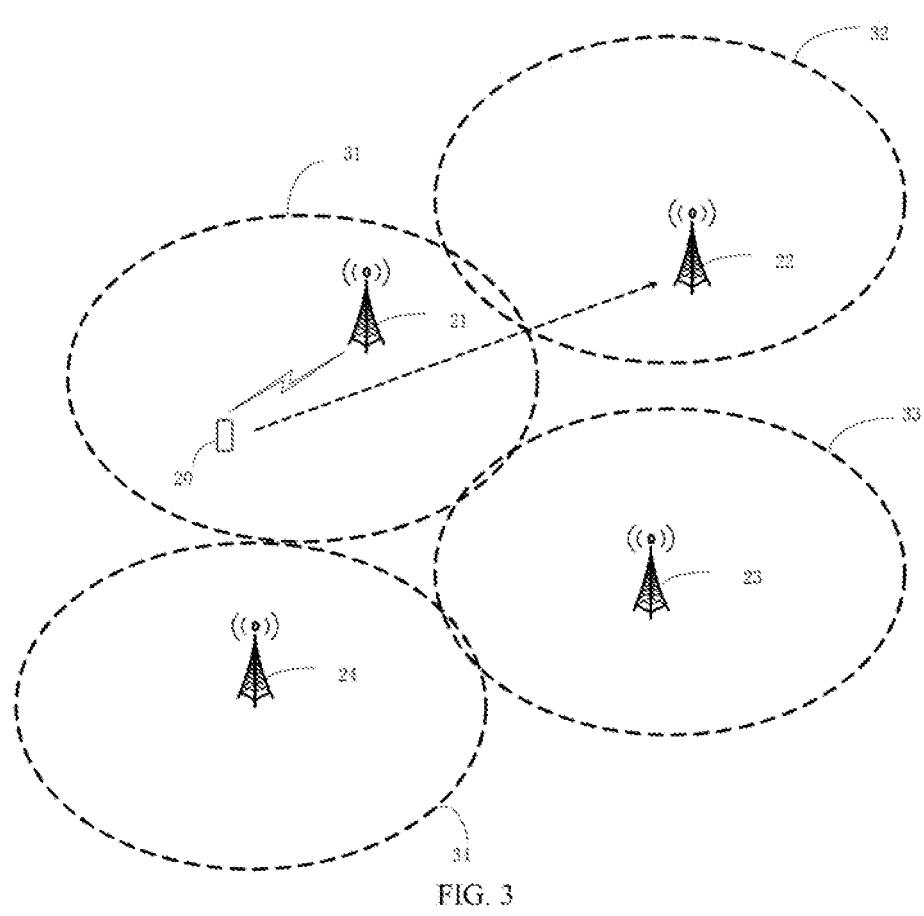
FIG. 3 is a schematic diagram of yet another communication system provided by the present application.

The management method for cell handover will be introduced below in conjunction with a schematic diagram of a specific communication system. As shown in FIG. 3, a cell where a terminal device 20 is currently located is a source cell 31, a source base station 21 is a network device corresponding to the source cell 31, and the terminal device 20 is currently communicatively connected to the source base station 21. A cell 32, a cell 33 and a cell 34 are neighboring cells of the source cell 31, respectively, a base station 23 is a network device corresponding to the cell 33, and a base station 24 is a network device corresponding to the cell 34. Candidate cells can be neighboring cells, or part of the neighboring cells.

Figure 4:
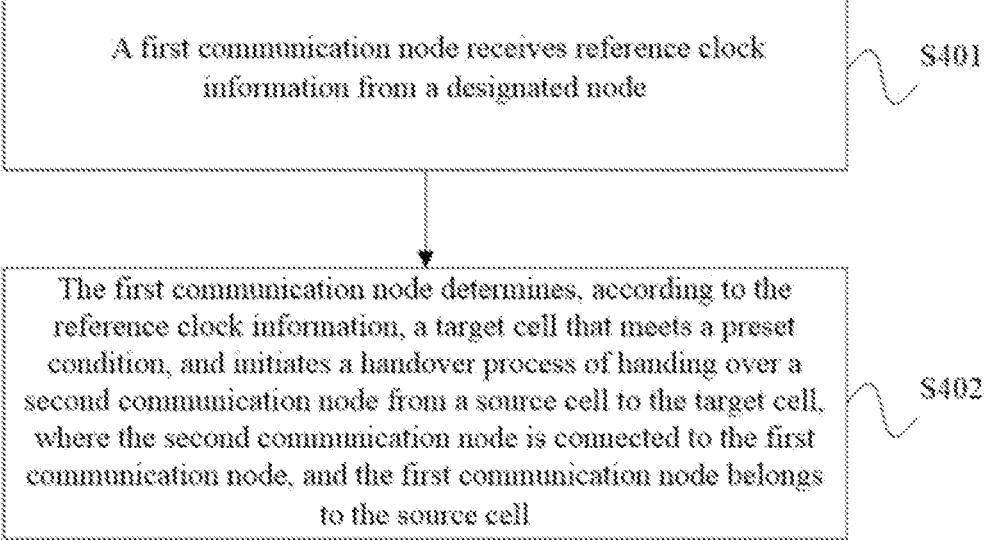
FIG. 4 is a flowchart of a management method for cell handover provided by the present application.

FIG. 4 is a flowchart of a management method for cell handover provided by the present application. As shown in FIG. 4, the management method for cell handover includes following steps:

S401, a first communication node receives reference clock information from a designated node.

S402, the first communication node determines, according to the reference clock information, a target cell that meets a preset condition, and initiates a handover process of handing over a second communication node from a source cell to the target cell, where the second communication node is connected to the first communication node, and the first communication node belongs to the source cell.

In the present embodiment, the first communication node is, for example, the source base station 21 shown in FIG. 3, and the second communication node is, for example, the terminal device 20 shown in FIG. 3. The designated node may be a network device corresponding to at least one candidate cell, for example, if the candidate cell is a neighboring cell of the source cell 31, the designated nodes are the base station 22, the base station 23 and the base station 24. If the candidate cell is part of the cells in the neighboring cells, for example, the candidate cells are the cell 32 and cell 33, the designated nodes are the base station 22 and base station 23. In addition, the designated node may also be the terminal device 20.

Specifically, the designated node may send the reference clock information to the source base station 21. Correspondingly, the source base station 21 receives the reference clock information, further determine, according to the reference clock information, a target cell that meets a preset condition, and initial a handover process of handing over the terminal device 20 from the source cell 31 to the target cell.

If the designated node is a network device corresponding to at least one candidate cell, for example, the base station 22, the base station 23 and the base station 24, the reference clock information may be, correspondingly, the reference clock information of the cell 32, the reference clock information of the cell 33, and the reference clock information of the cell 34. That is, the source base station 21 can determine, according to the reference clock information respectively corresponding to the cell 32, the cell 33 and the cell 34, the target cell that meets the preset condition from the cell 32, cell 33 and cell 34.

If the designated node is the terminal device 20, the reference clock information may be, correspondingly, measurement results after the terminal device 20 perform measurement on at least one candidate cell. That is, the source base station 21 can determine, according to the measurement results of the terminal device 20, the target cell that meets the preset condition from the at least one candidate cells.

In the management method for cell handover provided in the present embodiment, when the terminal device needs to be handed over from the source cell to another cell, the network device in the source cell determines, according to the reference clock information received from the designated node, the target cell that meets the preset condition, and further hands over the terminal device from the source cell to the target cell, where the preset condition may be a preset condition meeting the TSN or TSC clock requirements, that is, when the target cell meets the clock requirements of the TSN or the TSC, the terminal device can be handed over from the source cell to the target cell, so as to avoid the problem that when the terminal device is randomly handed over to one target cell and the target cell does not meet the TSN or TSC clock requirements, the latency of the TSN service or the TSC service is caused to increase or the QoS is caused to decrease.

On the basis of the above embodiment, the designated node can actively send the reference clock information to the source base station 21. Or it may also be that after the source base station 21 sends an indication message to the designated node, the designated node sends, according to the indication of the indication message, the reference clock information to the source base station 21, that is, the indication message can be used to instruct the designated node to feed back the reference clock information to the source base station 21. The following separately introduces the case where the designated node is a terminal device and the case where the designated node is a network device corresponding to at least one candidate cell.

Figure 5:
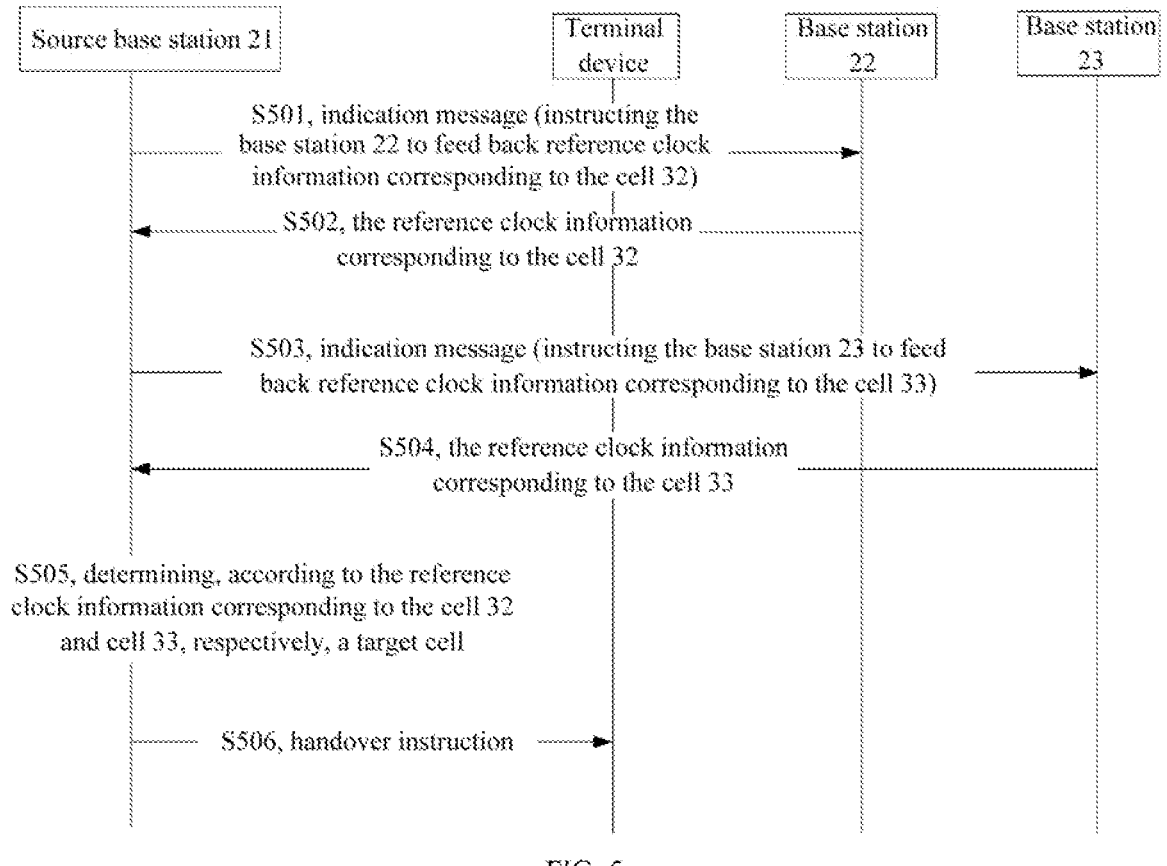
FIG. 5 is a signaling diagram of a management method for cell handover provided by the present application.

FIG. 5 is a signaling diagram of a management method for cell handover provided by the present application, where the designated node is a network device corresponding to at least one candidate cell, for example, the base station 22 and base station 23. As shown in FIG. 5, the management method for cell handover includes the following steps:

S501, the source base station 21 sends an indication message to the base station 22, where the indication message is used to instruct the base station 22 to feed back reference clock information corresponding to the cell 32.

S502, the base station 22 sends the reference clock information corresponding to the cell 32 to the source base station 21, and correspondingly, the source base station 21 receives the reference clock information.

S503, the source base station 21 sends an indication message to the base station 23, where the indication message is used to instruct the base station 23 to feed back the reference clock information corresponding to the cell 33.

S504, the base station 23 sends the reference clock information corresponding to the cell 33 to the source base station 21, and correspondingly, the source base station 21 receives the reference clock information.

S505, the source base station 21 determines, according to the reference clock information corresponding to the cell 32 and cell 33, respectively, the target cell.

S506, the source base station 21 sends a handover instruction to the terminal device.

After receiving the handover instruction, the terminal device performs the handover process of the air interface. For example, the terminal device sends a random access procedure to the target base station in the target cell, the terminal device is disconnected from the source base station, and the Packet Data Convergence Protocol (PDCP) of the terminal device and other entities are re-established. In addition, the source base station can also send, to the target base station, SN STATUS TRANSFER information, which is used to indicate both a receiving status of a uplink PDCP serial number (SN) and a sending status of a downlink PDCP SN. After the terminal device successfully accesses the target base station, that is, after the random access is successful, the target base station sends a path switch request to a mobility management entity (MME) network element, where the request is used to request the MME to switch the downlink path; when the path switching is completed, the target base station instructs the source base station to release the context of the terminal device, thereby the cell handover of the terminal device is completed.

It is understandable that, the present embodiment is not limited the execution order of some steps in S501 to S506. For example, S503 may be performed before S501, and S504 may be performed before S502.

In addition, in the present embodiment, if divided according to the type of the reference clock information, the reference clock information may include at least one of the following: reference clock information of Time Sensitive Networking TSN clock, reference clock information of Time Sensitive Conveying TSC clock, and reference clock information of a high-accuracy clock whose time accuracy meets a preset time accuracy threshold.

In addition, if divided according to the content of the reference clock information, the reference clock information may include at least one of the following: reference System Frame Number (SFN), TSC domain index, TSN domain index, time (for example, 10 ms and 1 μs pass 10:09:08), clock accuracy value (for example, 1 ms, 10 us and 1 μs), indication information of a clock accuracy type (for example, low accuracy, normal accuracy, high accuracy, etc.), time information type (timeInfoType), uncertainty.

In some scenarios, the reference clock information of a cell may also be at least one of: the difference between the reference SFN of the cell and the reference SFN of the neighboring cells of the cell, the difference between the clock accuracy value of the cell and the clock accuracy value of the neighboring cells of the cell, and the difference between the time of the cell and the time of the neighboring cells of the cell.

For example, the indication information of the clock accuracy type may be a 3-bit information bit. Taking 1 μs as the normal accuracy, an accuracy higher than 1 μs, such as 10 ns, is a high accuracy; and an accuracy lower than 1 µs, such as 1 ms, is a low accuracy. Specifically, a corresponding relationship between the high accuracy, the low accuracy or the normal accuracy and the 3-bit can be shown in Table 1 below:

TABLE 1

| Accuracy level | Bit |
|---|---|
| High accuracy | 100 |
| Normal accuracy | 010 |
| Low accuracy | 001 |

Understandably, the corresponding relationship shown in Table 1 is only a schematic description, and is not specifically limited.

Specifically, when the source base station 21 determines, according to the reference clock information corresponding to the cell 32 and cell 33 respectively, the target cell, the source base station 21 can determine, according to the reference clock information corresponding to the cell 32 and cell 33, the candidate cell in cell 32 and cell 33 whose clock accuracy is higher than a preset accuracy threshold or is the same as the clock accuracy of the source cell as the target cell. In other words, the preset condition described as above may specifically be that the clock accuracy is higher than or equal to the preset accuracy threshold, or the preset condition described above may specifically be that the clock accuracy is higher than or equal to the clock accuracy of the source cell.

For example, the reference clock information is specifically a clock accuracy value, and the clock accuracy value may also be referred to as a granularity of clock synchronization accuracy. For example, the clock accuracy value of the cell 32 is 10 ns, the clock accuracy value of the cell 33 is 1 ms, and the preset accuracy threshold is 1 µs. That is, the clock accuracy of the cell 32 is higher than the preset accuracy threshold, and the clock accuracy of the cell 33 is lower than the preset accuracy threshold. In order that the terminal device can transmit the TSN service or the TSC service normally after handed over to the target cell, the cell 32 whose clock accuracy is higher than the preset accuracy threshold may be used as the target cell. For another example, the clock accuracy of the source cell is 1 µs, it can be seen that the clock accuracy of the cell 32 is higher than the clock accuracy of the source cell, the clock accuracy of the cell 33 is lower than the clock accuracy of the source cell, and the cell 32 whose clock accuracy is higher than the clock accuracy of the source cell may be used as the target cell.

Understandably, in some scenarios, there may be multiple cells that meet the preset condition. For example, the clock accuracy of the cell 32 and the clock accuracy of the cell 33 are both higher than the preset accuracy threshold, or both are higher than the clock accuracy of the source cell. That is, there are multiple target cells. In this case, the target cell to which the terminal device can be handed over can be determined from multiple target cells through several possible implementations. For example, the cell with the highest clock accuracy among multiple target cells may be used as the target cell to which the terminal device can be handed over. Alternatively, the cell with the best channel quality among multiple target cells may be used as the target cell to which the terminal device can be handed over. Alternatively, the cell with the largest number of acceptable bearers or with the largest number of bearers that can be guaranteed among multiple target cells can be used as the target cell to which the terminal device can be handed over, where the number of acceptable bearers may specifically be the number of acceptable guaranteed hit rate (GBR) bearers, and the number of guaranteed bearers may specifically be the number of GBR bearers that can be guaranteed. Alternatively, the cell with the least load among multiple target cells may be used as the target cell to which the terminal device can be handed over. Understandably, here are just a few examples, and the target cell to which the terminal device can be handed over can also be determined from multiple target cells through other preset rules.

In addition, it is understandable that after receiving the reference clock information sent by the network device corresponding to at least one candidate cell, when the source base station determines, according to the reference clock information sent by the network device corresponding to at least one candidate cell, a target cell whose clock accuracy is higher than the preset accuracy threshold or whose clock accuracy is the same as the clock accuracy of the source cell, the source base station may determine that the clock accuracy of the at least one candidate cell is lower than the preset accuracy threshold or is lower than the clock accuracy of the source cell. Or, the source base station may determine that the clock accuracy of the at least one candidate cell is different from the preset accuracy threshold or is different from the clock accuracy of the source cell. In this case, the source base station can determine the target cell in the following possible ways.

One possible way is that the source base station uses a cell with a channel quality greater than a preset quality threshold in the at least one candidate cell as the target cell.

Another possible way is that the source base station determines the target cell according to a pre-configuration.

A further possible way is that the source base station uses the cell with the highest clock accuracy among the at least one candidate cell as the target cell.

Yet another possible way is that the source base station determines that the handover fails, and further releases the connection to the terminal device.

Yet a further possible way is that the source base station selects one candidate cell from the at least one candidate cell as the target cell.

In addition, after the source base station sends the indication message to the network devices corresponding to multiple candidate cells, it is possible that the network devices corresponding to some candidate cells will feed back the reference clock information of the corresponding candidate cells to the source base station, while the network devices corresponding to some other candidate cells may not feed back the reference clock information of the corresponding candidate cells. For example, after the source base station 21 sends the indication message to the base station 22, the base station 23 and the base station 24, respectively, the base station 22 feeds back the reference clock information of the cell 32, the base station 23 feeds back the reference clock information of the cell 33, while the base station 24 does not feed back the reference clock information or the cell 34. In this case, as a possible implementation, when determining the target cell, the source base station 21 can ignore the clock reference information of the cell 34, and determine, according to both the reference clock information of the cell 32 and the reference clock information of the cell 33, the target cell. For example, the source base station 21 can determine, according to the reference clock information of the cell 32, the clock accuracy of the cell 32, determine, according to the reference clock information of the cell 33, the clock accuracy of the cell 33, and further, determine, according to the clock accuracy of the cell 32 and the clock accuracy of the cell 33, the priority order in which the cell 32 and the cell 33 are selected as the target cell; if the clock accuracy of the cell 32 is higher than the clock accuracy of the cell 33, one priority order is that the priority of cell 32 is higher than the priority of the cell 33, and another priority order is that the priority of the cell 33 is higher than the priority of the cell 32. As another possible implementation, the source base station 21 may determine that the cell 34 is not the target cell.

In the management method for cell handover provided in the present embodiment, the source base station sends the indication message to the network device corresponding to at least one candidate cell, where the indication message is used to instruct the network device corresponding to the at least one candidate cell to send the reference clock information of the corresponding candidate cell to the source base station, and the source base station further determines, according to the reference clock information of the at least one candidate cell, a candidate cell whose clock accuracy is higher than a preset accuracy threshold or whose clock accuracy is the same as the clock accuracy of the source cell as the target cell, so that the target cell can meet the clock requirements of the TSN or the TSC, avoiding the problem that the latency of the TSN service or the TSC service increases or the QoS decreases.

In some scenarios, before sending an indication message to the network device corresponding to at least one candidate cell, the source base station may also send a handover request message to the network device corresponding to the at least one candidate cell. When receiving the handover response information fed back by the network device corresponding to the at least one candidate cell and the handover response information is Acknowledge character (ACK), the source base station sends the indication message to the network device corresponding to the at least one candidate cell. The following is an introduction with a specific embodiment.

Figure 6:
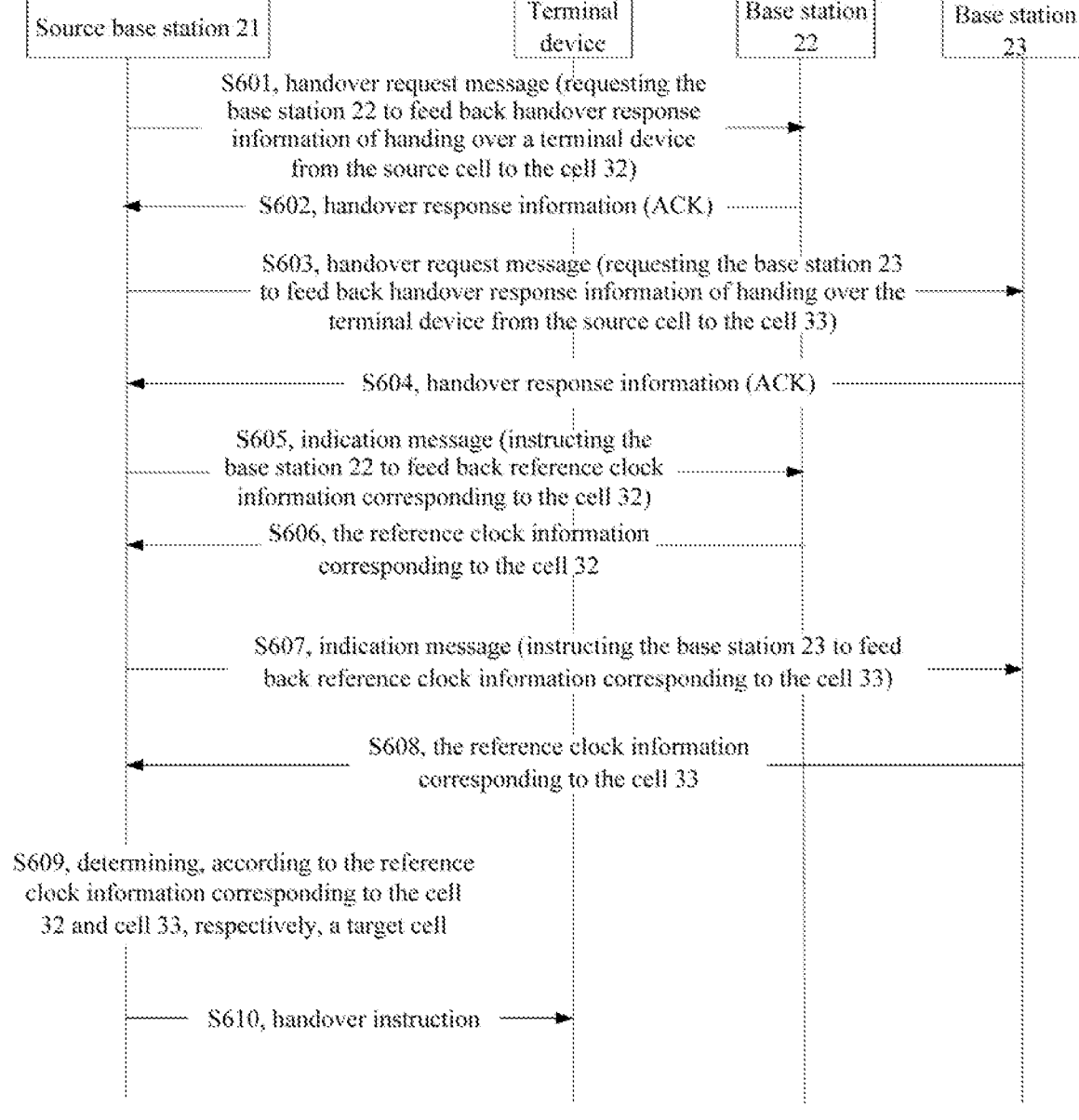
FIG. 6 is a signaling diagram of another management method for cell handover provided by the present application.

FIG. 6 is a signaling diagram of another management method for cell handover provided by the present application, where the candidate cells are the cell 32 and the cell 33, and the designated nodes are the base station 22 and the base station 23. As shown in FIG. 6, the management method for cell handover includes the following steps:

S601, the source base station 21 sends a handover request message to the base station 22, where the handover request message requests the base station 22 to feed back handover response information of handing over the terminal device from the source cell to the cell 32.

S602, the base station 22 sends the handover response information to the source base station 21, where the handover response information is ACK, and correspondingly, the source base station 21 receives the handover response information.

S603, the source base station 21 sends a handover request message to the base station 23, where the handover request message requests the base station 23 to feed back handover response information of handing over the terminal device from the source cell to the cell 33.

S604, the base station 23 sends the handover response information to the source base station 21, where the handover response information is ACK, and correspondingly, the source base station 21 receives the handover response information.

S605, the source base station 21 sends an indication message to the base station 22, where the indication message is used to instruct the base station 22 to feed back the reference clock information corresponding to the cell 32.

S606, the base station 22 sends the reference clock information corresponding to the cell 32 to the source base station 21, and correspondingly, the source base station 21 receives the reference clock information.

S607, the source base station 21 sends an indication message to the base station 23, where the indication message is used to instruct the base station 23 to feed back reference clock information corresponding to the cell 33.

S608, the base station 23 sends the reference clock, information corresponding to the cell 33 to the source base station 21, and correspondingly, the source base station 21 receives the reference clock information.

S609, the source base station 21 determines, according to the reference clock information corresponding to the cell 32 and the cell 33, respectively, the target cell.

S610, the source base station 21 sends a handover instruction to the terminal device.

Understandably, the present embodiment does not limit execution order of some steps in S601 to S610. For example, S607 may be performed before S605, and S608 may be performed before S606. In addition, S605 may be performed after S602, and S607 may be performed after S604.

Taking the base station 22 as an example, after receiving the handover request message, the base station performs handover determination, that is, an access control. Specifically, the base station 22 can determine, according to the number of acceptable bearers of the cell 32, the number of bearers that can be guaranteed, the channel quality of the cell 32, load condition of the cell 32, etc., whether the terminal device can be handed over to the cell 32. If determining that the terminal device can be handed over to the cell 32, the base station 22 sends handover response information to the source base station 21, and the handover response information is ACK. If determining that the cell 32 cannot receive the terminal device, the base station 22 sends handover response information to the source base station 21, and the handover response information is Negative ACKnowledgment (NACK). The method for the base station 23 to send handover response information to the source base station 21 is similar to the above method, which will not be repeated herein.

Understandably, if the handover response information sent by the base station 22 to the source base station 21 is NACK, in subsequent steps, for example, in S605, the source base station 21 does not need to send the indication message to the base station 22. Similarly, if the handover response information sent by the base station 23 to the source base station 21 is NACK, in the subsequent steps, for example, in S607, the source base station 21 does not need to send the indication message to the base station 23.

Understandably, if the source base station sends the handover request message to the network devices of multiple candidate cells, all the handover response information fed back by the network devices of the multiple candidate cells is NACK. For example, the source base station 21 sends the handover request message to the base station 22 and the base station 23, respectively, and the handover response information fed back by the base station 22 and the base station 23 are both NACK; at this point, the source base station 21 may continue to determine at least one new candidate cell. For example, the cell 34 may be used as a candidate cell. And further, a handover request message may be sent to the base station 24. If handover response information fed back by the base station 24 is ACK, and the cell 34 meets the preset condition described above, the cell 34 can be used as the target cell, and the terminal device 20 can be handed over from the source cell 31 to the target cell 34. Alternatively, the source base station may also select a candidate cell that feeds back ACK for handover, regardless of the reference clock information of the candidate cell. For example, the source base station may not consider the reference clock information of the cell 34, and when the handover response information fed back by the base station 24 is ACK, the source base station can then hand over the terminal device 20 from the source cell 31 to the target cell 34. If the handover response information fed back by the base station 24 is NACK, that is, none of the neighboring cells of the source cell 31 can receive the terminal device, the source base station 21 can disconnect the terminal device from the source base station 21, or the source base station 21 may select a cell that feeds back the ACK for handover, regardless of the reference clock information.

In the management method for cell handover provided in the present embodiment, before sending the indication message to the network device corresponding to the at least one candidate cell, the source base station sends a handover request message to the network device corresponding to the at least one candidate cell. When the source base station receives the handover response information fed back by the network device corresponding to the at least one candidate cell and the handover response intimation is ACK, the source base station sends an indication message to the network device corresponding to the at least one candidate cell; if the handover response information fed back by a candidate cell is NACK, the source base station does not send the indication message to the network device corresponding to the candidate cell, thereby saving the resource overhead for the source base station to send the indication message.

In some other scenarios, the indication message sent by the source base station to the network device corresponding to the at least one candidate cell may also be carried in the handover request message. The reference clock information of the at least one candidate cell fed back by the network device corresponding to the at least one candidate cell may be carried in the handover response information. For example, on the basis of FIG. 5, in S501, the source base station 21 sends a handover request message to the base station 22, and the handover request message includes an indication message, where the meaning of the handover request message and the meaning of the indication message are specifically described above, which will not be repeated herein. Similarly, in S503, the source base station 21 sends a handover request message to the base station 23, and the handover request message includes an indication message. In S502, the base station 22 sends handover response information to the source base station 21, and the handover response information includes the reference clock information corresponding to the cell. Similarly, in S504, the base station 23 sends handover response information to the source base station 21, and the handover response information includes the reference clock information corresponding to the cell 33, where the meaning of the handover response information and the meaning of the reference clock information are specifically described above, which will not be repeated herein.

In the management method for cell handover provided in the present embodiment, the indication message is carried by the handover request message sent by the source base station to the network device corresponding to at least one candidate cell, and the reference clock information is carried by the handover response information fed back by the network device corresponding to the at least one candidate cell, which further save resource overhead.

In yet some other scenarios, the source base may not carry the indication message in the handover request message, and instead the network device corresponding to at least one candidate cell feeds back by itself the reference clock information of the at least one candidate cell in the handover response information. For example, based on FIG. 5, the source base station 21 sends the indication message to the base station 22, and an indication message is not carried in the handover request message. In S502, the base station 22 sends the handover response information to the source base station 21, and the base station 22 feeds back by itself the reference clock information corresponding to the cell 32 in the handover response information. In other words, the handover request message does not carry an indication message, and the handover response information carries the reference clock information. Similarly, the method is also applicable to S503 and S504, which will not be repeated here.

Figure 7:
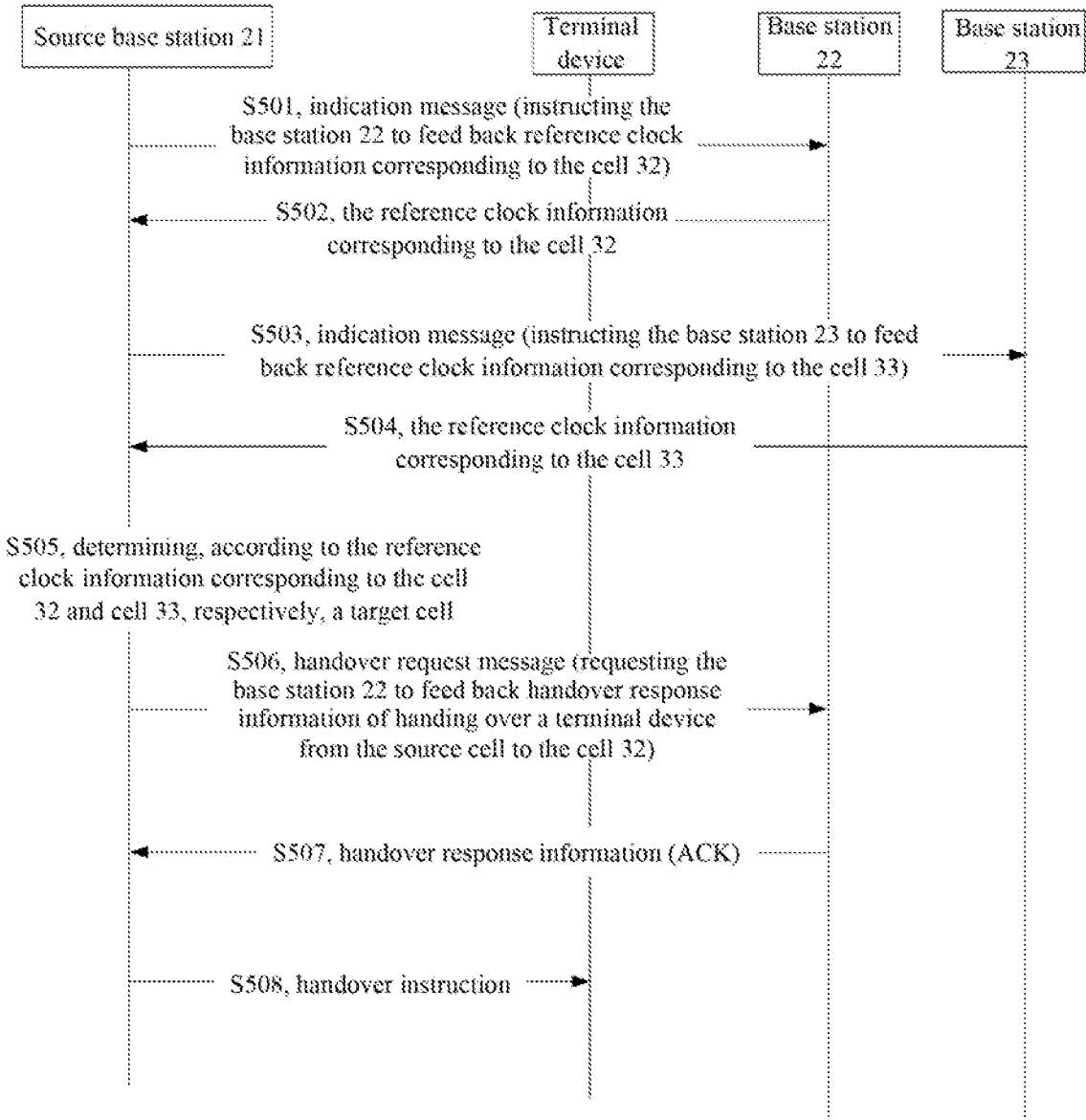
FIG. 7 is a signaling diagram of another management method for cell handover provided by the present application.

In yet some other scenarios, a source base station may send an indication message to a network device corresponding, to at least one candidate cell, after determining, according to reference clock information corresponding to the at least one candidate cell fed back by the network device corresponding to the at least one candidate cell, a target call, send a handover request message to a network device corresponding to the target cell, and send, when handover response information fed back by the network device corresponding to the target cell is ACK, a handover instruction to the terminal device. As shown in FIG. 7, on the basis of FIG. 5, if in S505, when the source base station 21 determines, according to the designated reference clock information respectively corresponding to the cell 32 and the cell 33, that the target cell is the cell 32, in S506, the source base station 21 sends a handover request message to the base station 22 to request the base station 22 to feed back handover response information of handing over the terminal device from the source cell to the cell 32. If in S507, the handover response information fed back by the base station 22 to the source base station 21 is ACK, then further, in S508, the source base station 21 sends a handover instruction to the terminal device. That is, if in S507, the handover response information fed back by the base station 22 to the source base station 21 is NACK, the source base station 21 needs to re-determine a target cell.

On the basis of the above embodiments, when the source base station 21 sends a handover request message to the network device corresponding to the candidate cell or to the network device corresponding to the target cell, the source base station 21 may also carry the reference clock information of the source cell 31 in the handover request message. When receiving the handover request message, the network device corresponding to the candidate cell or the network device corresponding to the target cell can determine, according to the reference clock information of the source cell 31, whether the clock accuracy of the candidate cell or the target cell is the same as the clock accuracy of the source cell 31, or can determine, according to the reference clock information of the source cell 31, whether the candidate cell or the target cell can accept the handover of the terminal device, the clock accuracy of the candidate cell or the target cell is higher than the clock accuracy of the source cell 31, or the clock accuracy of the candidate cell or the target cell is the same as the clock accuracy of the source cell 31, it is determined that the network device corresponding to the candidate cell or the network device corresponding to the target cell can transmit the TSN service or the TSC service, and it is further determined that the handover response information fed back to the source base station is ACK. If the clock accuracy of the candidate cell or the target cell is lower than the clock accuracy of the source cell 31, it is determined that the network device corresponding to the candidate cell or the network device corresponding to the target cell cannot transmit the TSN service or the TSC service normally, thereby determining that the terminal device cannot be handed over to the candidate cell or the target cell, or determining that the access control fails, or that the handover response information will not be sent, or determining that the handover response information fed back to the source base station is NACK. Understandably, if the target base station is a network device in a candidate cell or the target cell, the target base station can also feed back the reference clock information of the candidate cell or of the target cell to the source base station, and it is the source base station that determines, according to the reference clock information of the candidate cell or of the target cell, whether the terminal device can be handed over to the target cell or to the candidate cell.

In the management method for cell handover provided in the present embodiment, the reference clock information of the source cell is carried in the handover request message through the source base station; when receiving the handover request message, the network device corresponding to the candidate cell or the network device corresponding to the target cell can determine, according to the reference clock information of the source cell, whether the terminal device can be handed over to the candidate cell or to the target cell, which improves the flexibility of access control for the candidate cell or the target cell.

Understandably, no matter which of the above methods is adopted, when obtaining the reference clock information of the candidate cell or of the target cell, the source base station may send the reference clock information to the UE through a radio resource control (RRC) message or a handover instruction. The UE can save the reference clock information. The reference clock information can be used for: TSC synchronization between the UE and the target cell, TSC synchronization between the UE and the target base station, TSN synchronization between the UE and the target cell, TSN synchronization between the UE and the target base station, TSC service transmission between the UE and the target cell, TSC service transmission between the UE and the target base station, measurement reporting, etc.

Figure 8:
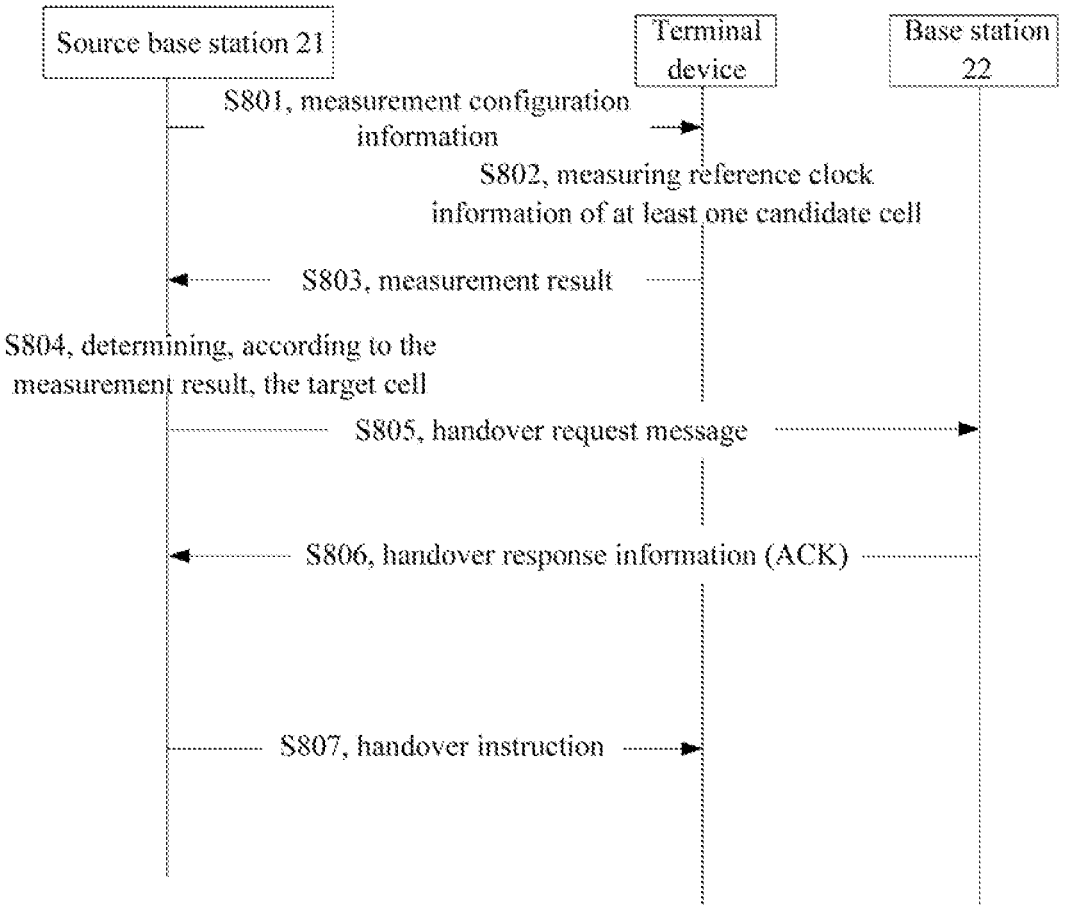
FIG. 8 is a signaling diagram of yet another management method for cell handover provided by the present application.

The above embodiment introduces the case where the designated node is a network device corresponding to at least one candidate cell. The following will introduce the case where the designated node is the terminal device. FIG. 8 is a signaling diagram of another management method for cell handover provided by the present application. As shown in FIG. 8, the management method for cell handover includes the following steps:

S801, the source base station 21 sends measurement configuration information to the terminal device.

As shown in FIG. 3, the source base station 21 sends the measurement configuration information to the terminal device 20, where the measurement configuration information may include identification information of at least one candidate cell designated by the source base station 21, and the measurement configuration information is used to instruct the terminal device 20 to acquire reference clock information of the at least one candidate cell. For example, the at least one candidate cell is the cell 32, the cell 33 and the cell 34.

S802, the terminal device measures the reference clock information of the at least one candidate cell.

Specifically, the terminal device 20 reads system information of the cell 32, the cell 33 and the cell 34, respectively, acquires the reference clock information of the cell 32 from the system information of the cell 32, acquires the reference clock information of the cell 33 from the system information of the cell 33, and acquires the reference clock information of the cell 34 from the system information of the cell 34, where the system information may specifically be at least one of system information block (SIB) 1, SIB9 and master system information block (MIB). Further, the terminal device 20 may also save the reference clock information corresponding to the cell 32, the cell 33 and the cell 34 locally, for at least one of: subsequent measurement reporting, synchronization (for example, TSC synchronization or TSN synchronization) between the terminal device 20 and the target base station, service transmission (for example, TSC service transmission) between the terminal device 20 and the target base station.

S803, the terminal device sends measurement result to the source base station 21.

Specifically, the measurement configuration information includes an indication message. In a possible case, the indication message is used to instruct the terminal device 20 to feed back reference clock information of at least one candidate cell designated by the source base station 21. In this case, the measurement result sent by the terminal device 20 to the source base station 21 includes the reference clock information corresponding to the cell 32, the cell 33 and the cell 34, respectively.

In another possible case, the indication message is used to instruct the terminal device 20 to feed back a candidate cell, among the at least one candidate cell, whose clock accuracy is higher than a preset accuracy threshold or whose clock accuracy is the same as clock accuracy of the source cell, or the indication message is used to instruct the terminal device 20 to feed back the reference clock information of the candidate cell, among the at least one candidate cell, whose clock accuracy is higher than the preset accuracy threshold or whose clock accuracy is the same as the clock accuracy of the source cell. In this case, after acquiring the reference clock information respectively corresponding to the cell 32, the cell 33 and the cell 34, the terminal device 20 further determines the candidate cell, among the cell 32, the cell 33 and the cell 34, whose clock accuracy is higher than the preset accuracy threshold or whose clock accuracy is the same as the clock accuracy of the source cell. For example, if the clock accuracy of the cell 32 is higher than the preset accuracy threshold, the clock accuracy of the cell 33 is the same as the clock accuracy of the source cell 31, and the clock accuracy of cell 34 is lower than the clock accuracy of source cell 31, the measurement result sent by the terminal device 20 to the source base station 21 includes the reference clock information respectively corresponding to the cell 32 and the cell 33, but does not include the reference clock information of the cell 34.

Or, after acquiring the reference clock information described in S802, the UE only measures the candidate cell whose clock accuracy is higher than the preset accuracy threshold or whose clock accuracy is the same as the clock accuracy of the source cell.

S804, the source base station 21 determines, according to the measurement result, a target cell.

If the measurement result includes the reference clock information respectively corresponding to the cell 32, the cell 33 and the cell 34, the source base station 21 may determine, according to the reference clock information respectively corresponding to the cell 32, the cell 33 and the cell 34, a cell, among the cell 32, the cell 33 and the cell 34, whose clock accuracy is higher than the preset accuracy threshold or whose clock accuracy is the same as the clock accuracy of the source cell as the target cell. If there are multiple target cells, the method described in the above embodiments may be used to determine the target cell to which the terminal device can be banded over from the multiple target cells.

If the measurement result includes the reference clock information of a cell whose clock accuracy is higher than the preset accuracy threshold or whose clock accuracy is the same as the clock accuracy of the source cell, for example, the reference clock information respectively corresponding to the cell 32 and the cell 33, since there are multiple cells that meet the preset condition, the target cell to which the terminal device can be handed over can be determined, similarly according to the method described in the above embodiments, from a plurality of cells that meet the preset condition.

For example, the target cell to which the terminal device can be handed over is the cell 32.

S805, the source base station 21 sends a handover request message to the base station 22, where the handover request message is used to request the base station 22 to feed back handover response information of handing over the terminal device 20 from the source cell 31 to the target cell 32.

For example, after receiving the handover request message, the base station 22 performs handover determination, that is, an access control, so as to determine whether the terminal device 20 can be handed over to the target cell, and further sends the handover response information to the source base station 21.

S806, the base station 22 sends the handover response information to the source base station 21, where the handover response information is ACK.

S807, the source base station 21 sends a handover instruction to the terminal device, where the handover instruction is used to instruct the terminal device 20 to be handed over from a connection to the source base station 21 to the connection to the target base station 22 in the target cell 32.

When receiving the handover instruction, the terminal device performs a handover process of the air interface, where the handover process is specifically described in the above embodiments, which will not be repeated herein.

Further, the handover instruction may also include the reference clock information of the target cell 32, that is, the source base station 21 can send the reference clock information of the target cell 32 to the terminal device 20 through the handover instruction, and the terminal device 20 may save the reference clock information of the target cell 32.

Alternatively, after determining the target cell that meets the preset condition, the source base station 21 may also send a radio resource control (RRC) message to the terminal device 20, and the RRC message may include the reference clock information of the target cell 32. That is, the source base station 21 may also send the reference clock information of the target cell 32 to the terminal device 20 through an RRC message, and the terminal device 20 may save the reference clock information of the target cell 32.

In the management method for cell handover provided by the present embodiment, the source base station sends the measurement configuration information to the terminal device, so that the terminal device measures the reference clock information of at least one candidate cell and sends the measurement result to the source base station; the source base station determines, according to the measurement result, the target cell, and sends a handover request message to the target cell; when the handover response information fed back by the target cell is ACK, the source base station sends a handover instruction to the terminal device, so that the terminal device is handed over from the communication connection to the source base station to the communication connection to the target base station in the target cell, which improves the flexibility of the source base station to determine the target cell.

Figure 9:
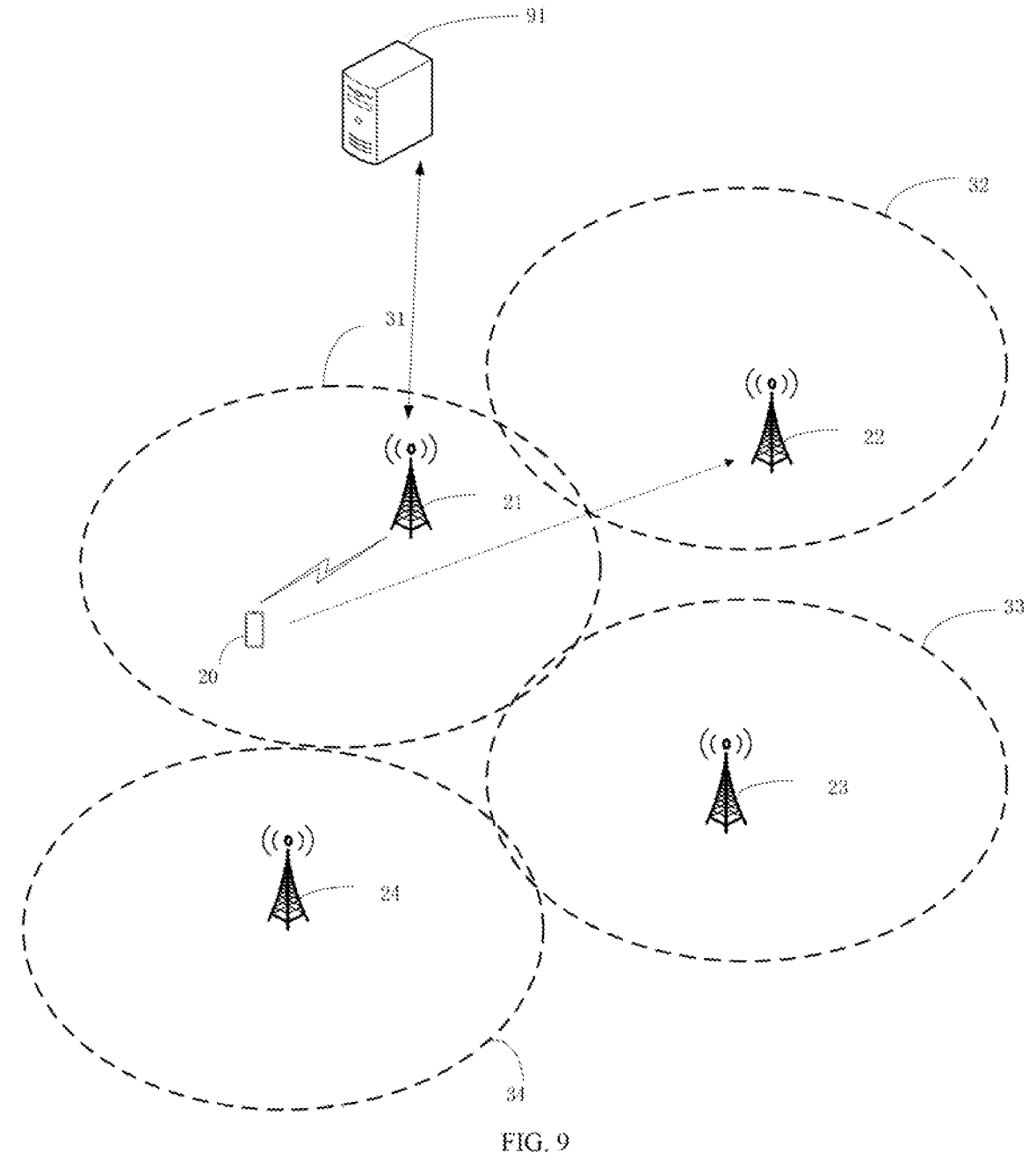
FIG. 9 is a schematic diagram of yet another communication system provided by the present application.

According to the above embodiments, it can be known that the source base station may acquire the reference clock information from the network device of at least one candidate cell or the terminal device. In the following embodiments, the source base station may save the reference clock information locally; or, the source base station may acquire the reference clock information from a core network element, or from an OAM, or from a CNC. As shown in FIG. 9, a network device 91 may specifically be an OAM network element, a CNC network element or an AMF network element; in other words, the network device 91 may specifically be the third communication node as described above. The network device mar communicate with a source base station 21.

In one possible implementation, the source base station 21 can detect locally saved reference clock information, determine, according to the reference clock information, a target cell that meets a preset condition, and initiate a handover process of handing over the terminal device from a source cell to the target cell. For example, the source base station 21 may locally save reference clock information respectively corresponding to neighboring cells of the source cell 31, namely the cell 32, the cell 33 and the cell 34; further, according to the reference clock information respectively corresponding to the cell 32; the cell 33 and the cell 34, a cell, in the cell 32, the cell 33 and the cell 34, whose clock accuracy is higher than a preset accuracy threshold or whose clock accuracy is the same as a clock accuracy of the source cell 31 is determined as the target cell. If the clock accuracies of two or more cells, in the cell 32, the cell 33 and the cell 34, are higher than the preset accuracy threshold or are the same as the clock accuracy of the source cell 31, that is, there are multiple target cells, the target cell to which the terminal device can be handed over can be determined from the multiple target cells according to the method described in the above embodiments. Alternatively, the source base station 21 may locally save the reference clock information respectively corresponding to the neighboring cells of the active cell 31, namely the cell 32, the cell 33 and the cell 34, and the source base station, 21 detects locally saved reference clock information of at least one candidate cell in the neighboring cells. For example, the source base station 21 detects the reference clock information of the candidate cell 32 and the candidate cell 33, further determines, according to the reference clock information of the candidate cell 32 and the candidate cell 33, a cell, among the candidate cell 32 and the candidate cell 33, whose clock accuracy is higher than the preset accuracy threshold or whose clock accuracy is the same as the clock accuracy of the source cell 31 as the target cell, and initiates the handover process of handing over the terminal device from the source cell to the target cell, where the handover process is as described above and will not be repeated herein.

Figure 10:
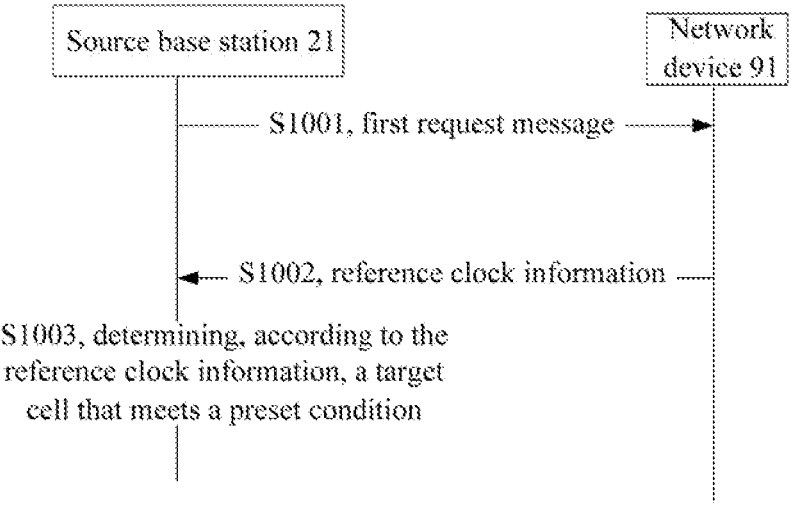
FIG. 10 is a signaling diagram of yet another management method for cell handover provided by the present application.

In another possible implementation, as shown in FIG. 10, the source base station 21 acquires the reference clock information from the network device 91, determines, according to the reference clock information, a target cell that meets the preset condition, and initiates the handover process of handing over the terminal device from the source cell to the target cell. Specifically, the following steps are involved:

S1001, the source base station 21 sends a first request message to the network device 91, where the first request message is used to request the network device 91 to feed back reference clock information.

S1002, the network device 91 sends the reference clock information to the source base station 21.

S1003, the source base station 21 determines, according to the reference clock information, a target cell that meets the preset condition, and initiates a handover process of handing over the terminal device from the source cell to the target cell.

For example, the network device 91 may save the reference clock information respectively corresponding to the neighboring cells of the source cell 31, namely the cell 32, the cell 33 and the cell 34. In S1001, the first request message is used to request the network device 91 to feed back the reference clock information of the neighboring cells of the source cell 31. Correspondingly, in S1002, the network device 91 sends the reference clock information respectively corresponding to the cell 32, the cell 33 and the cell 34 to the source base station 21. In S1003, the source base station 21 determines, according to the reference clock information respectively corresponding to the cell 32, the cell 33 and the cell 34, a cell, among the cell 32, the cell 33 and the cell 34, whose clock accuracy is higher than the preset accuracy threshold or whose clock accuracy is the same as the clock accuracy of the source cell 31 as the target cell. If the clock accuracies of two or more cells in the cell 32, the cell 33 and the cell 34, are higher than the preset accuracy threshold or are the same as the clock accuracy of the source cell 31, that is, there are multiple target cells, the target cell to which the terminal device can be handed over can be determined from the multiple target cells according to the method described in the above embodiments.

Alternatively, the network device 91 may save the reference clock information respectively corresponding to the neighboring cells of the active cell 31, that is, the cell 32, the cell 33, and the cell 34. In S1001, the first request message is used to request the network device 91 to feed back the reference clock information of at least one candidate cell in the neighboring cells of the source cell 31, and correspondingly, in S1002, the network device 91 sends the reference clock information of both the candidate cell 32 and the candidate cell 33 to the source base station 21. In S1003, the source base station 21 determines, according to the reference clock information of the candidate cell 32 and the candidate cell 33, a cell from the cell 32 and the cell 33, whose clock accuracy is higher than the preset accuracy threshold or whose clock accuracy is the same as the clock accuracy of the source cell 31 as the target cell, and initiates the handover process of handing over the terminal device from the source cell to the target cell, where the handover process is specifically as described above and will not be repeated herein.

Figure 11:
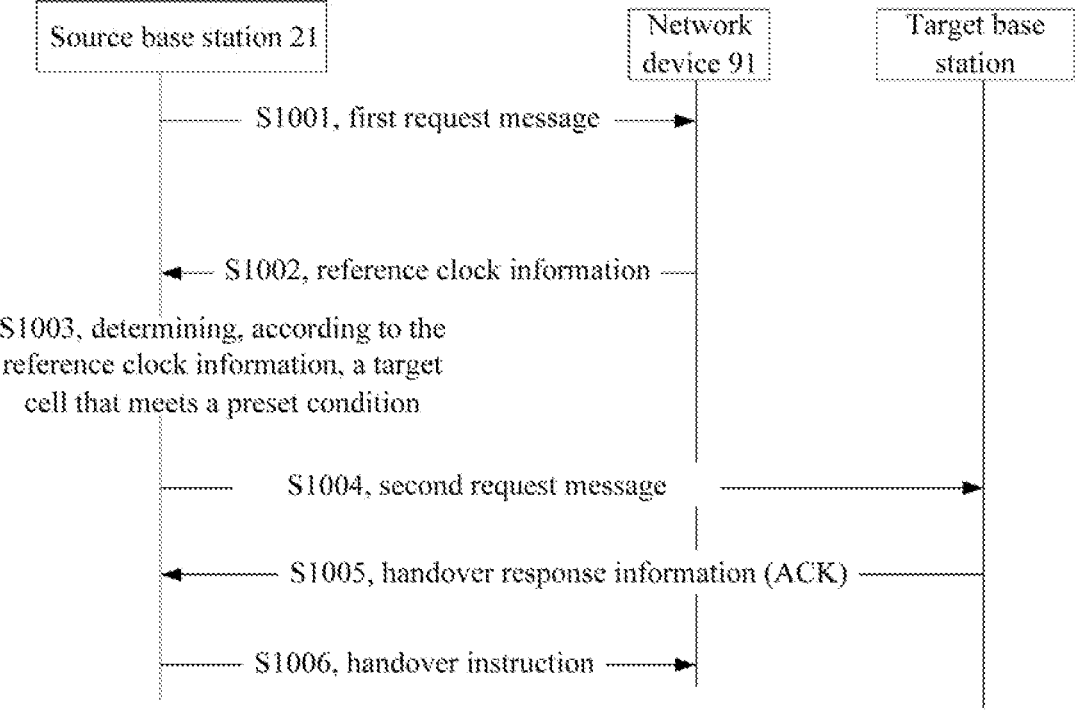
FIG. 11 is a signaling diagram of yet another management method for cell handover provided by the present application.

In another possible implementation, the source base station 21 may detect locally saved reference clock information, send the first request message to the network device 91, further determine, according to the locally saved reference clock information and the reference clock information fed back by the network device 91, the target cell that meets the preset condition, and initiate the handover process of handing over the terminal device from the source cell to the target cell. Specifically, the target cell is the cell 32, the target base station is the base station 22 in the cell 32, and the handover process may include the following steps as shown in FIG. 11:

S1004, the source base station 21 sends a second request message to the target base station, where the second request message is used to request the target base station to feed back the handover response information of handing over the terminal device from the source cell to the target cell.

In this embodiment, the second request message may be the handover request message as described above.

S1005, the target base station sends handover response information to the source base station 21, where the handover response information is ACK.

S1006, the source base station 21 sends a handover instruction to the terminal device, where the handover instruction is used to instruct the terminal device to be handed over from a connection to the source base station 21 to the connection to the target base station.

Understandably, the meaning of the reference clock information described in the present embodiment is the same as the meaning of the reference clock information described in the above embodiments, which will not be repeated herein.

In addition, the handover instruction may also include the reference clock information of the target cell. That is, the source base station 21 can send the reference clock information of the target cell 32 to the terminal device 20 through the handover instruction, and the terminal device 20 may save the reference clock information of the target cell 32.

Alternatively, after determining the target cell that meets the preset condition, the source base station 21 may also send an RRC message to the terminal device 20, where the RRC message may include the reference clock information of the target cell 32, that is, the source base station 21 may also send the reference clock information of the target cell 32 to the terminal device 20 through the RRC message, and the terminal device 20 may save the reference clock information of the target cell 32.

Similarly, the source base station 21 may also send to the terminal device the locally saved reference clock information of the neighboring cells of the source cell or of the at least one candidate cell, or the reference clock information of the neighboring cells or of the at least one candidate cell acquired from an OAM network element, a CNC network element or a AMF network element, and the terminal device saves the reference clock information of the neighboring cells or of the at least one candidate cell locally, for at least one of: subsequent measurement reporting, synchronization between the terminal device 20 and the target base station after the terminal device 20 is handed over to the target cell, service transmission between the terminal device 20 and the target base station after tile terminal device 20 is handed over to the target cell.

In addition, the source base station 21 may further locally save clock requirements for the transmission of the TSN service or the TSC service. Alternatively, the OAM network element, the clock requirements for the transmission of the TSN service or TSC service are saved in the CNC network element or the AMF network element, and the source base station 21 acquires such clock requirements from the OAM network element, the CNC network element or the AMF network element. Specifically, the clock requirements include at least one of the following: supporting the TSN service or supporting the TSC service, types of the supported TSN service or the supported TSC service, supported TSC domain index, supported TSN domain index, whether to support high accuracy or low accuracy, and supported granularity of accuracy. Specifically, when determining the target cell that meets the preset condition, the source base station may determine, according to both the clock requirements and the reference clock information of the neighboring cells, the neighboring cell whose reference clock information meets the clock requirements as the target cell. Alternatively, the source base station may determine, according to both the clock requirements and the reference clock information of the at least one candidate cell, a candidate cell whose reference clock information meets the clock requirements as the target cell.

In some other embodiments, the OAM network element, the CNC network element or the AMF network element can also be used to save at least one of the following: location relationship between the source cell and its neighboring cell, reference clock information of the source cell, reference clock information of the neighboring cell and the difference between the reference clock information of the source cell and the reference clock information of the neighboring cell, where the reference clock information of the source cell and the reference clock information of the neighboring cell may respectively include at least one of the following: reference System Frame Number (SFN), TSC domain index, TSN domain index, time (e.g. 10 ms and 1 μs pass 10:09:08), clock accuracy value (for example, 1 ms, 10 ns, 1 μs), indication formation of a clock accuracy type (for example, low accuracy, normal accuracy, high accuracy, etc.), time information type (timeInfoType), and uncertainty; and the difference between the reference clock information of the source cell and the reference clock information of the neighboring cell may include at least one of the following: the difference between the reference SFN of the source cell and the reference SFN of the neighboring cell, the difference between the clock accuracy value of the source cell and the clock accuracy value of the neighboring cell, and the difference between the time of the source cell and the time of the neighboring cell. That is to say, the source base station can not only acquire the reference clock information of the neighboring cell from the OAM network element, the CNC network element or the AMF network element, but also request to acquire at least one of the following from the OAM network element, the CNC network element or the AMF network element: the location relationship between the source cell and its neighboring cell, the reference clock information of the source cell, and the difference between the reference clock information of the source cell and the reference clock information of the neighboring cell.

Additionally, in some embodiments, when determining that there are multiple target cells that meet the preset condition, the source cell can also send identification it of the multiple target cells to the OAM network element, the CNC network element or the AMF network element, and the OAM network element, the CNC network element or the AMF network element may determine, according to the reference clock information of the multiple target cells, the priority order in which the multiple target cells could be used as the target cells to which the terminal device can be handed over. Further, the OAM network element, the CNC network element or the AMF network element sends the priority order to the source cell, and the source cell determines, according to the priority order, the target cell to which the terminal device can be handed over.

In the management method for cell handover provided by the present embodiment, the source base station detects the locally saved reference clock information, and/or acquires the reference clock information from the OAM network element, the CNC network element or the AMF network element, further, determines, according to the reference clock information, the target cell that meets the preset condition, and initiates the handover process of handing over the terminal device from the source cell to the target cell, which further improves the flexibility for the source base station to determine the target cell.

Figure 12:
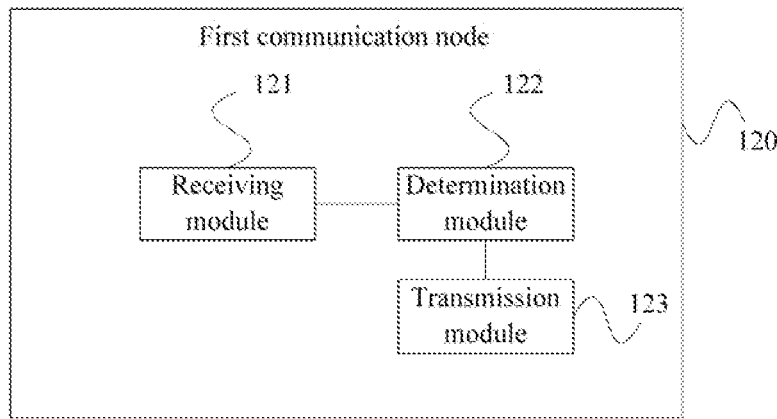
FIG. 12 is a schematic structural diagram of first communication node provided by the present application.

FIG. 12 is a schematic structural diagram of a first communication node provided by the present application. As shown in FIG. 12, the first communication node 120 includes:

a receiving module 121, configured to receive reference clock information from a designated node;

a determination module 122, configured to determine, according to the reference clock information, a target cell that meets a preset condition, and initiate a handover process of handing over a second communication node from a source cell to the target cell, where the second communication node is connected to the first communication node, and the first communication node belongs to the source cell.

The first communication node provided in the present embodiment is configured to perform the technical solution on the first communication node side according to any of the above-describe method embodiments, and implementation principle and technical effect thereof are similar to those of the first communication node according to any of the above method embodiments, which will not be repeated herein.

On the basis of the above embodiment shown in FIG. 12, the first communication node further includes: a transmission module 123, configured to send an indication message to the designated node before the receiving module 121 receives the reference clock information from the designated node, where the indication message is configured to instruct the designated node to send reference clock information of a cell corresponding to the designated node.

In an implementation, when the designated node is a network device corresponding to the at least one candidate cell, the transmission module 123 is specifically configured to: send the indication message to a network device corresponding to the at least one candidate cell, where the indication message is used to instruct the network device corresponding to the at least one candidate cell to send reference clock information corresponding to the at least one candidate cell; the determination module is specifically configured to: determine, according to the reference clock information sent by the network device corresponding to the at least one candidate cell, the target cell: the transmission module 123 is further configured to: send a handover instruction to the second communication node, where the handover instruction is used to instruct the second communication node to hand over from a connection to the first communication node to a connection to a network device corresponding to the target cell.

In an implementation, when sending the indication message to the network device corresponding to the at least one candidate cell, the transmission module 123 is specifically configured to: send a handover request message to the network device corresponding to the at least one candidate cell, where the handover request message is used to request the network device corresponding to the at least one candidate cell to send handover response information of handing over the second communication node from the source cell to the candidate cell; send the indication message to the network device corresponding to the candidate cell whose handover response information is ACK.

In an implementation, when sending the indication message to the network device corresponding to the at least one candidate cell, the transmission module 123 is specifically configured to: send a handover request message to the network device corresponding to the at least one candidate cell, where the handover request message includes the indication message; when receiving the reference clock information from the designated node, the receiving module 121 is specifically configured to: receive, from the network device corresponding to the at least one candidate cell, handover response information of handing over the second communication node from the source cell to the candidate cell, where the handover response information includes the reference clock information.

In an implementation, the transmission module 123 is further configured to: after the determination module determines, according to the reference clock information sent by the network device corresponding to the at least one candidate cell, the target cell, send a handover request message to the network device corresponding to the target cell, where the handover request message is used to request the network device corresponding to the target cell to send the handover response information of handing over the second communication node from the source cell to the target cell; when sending the handover instruction to the second communication node, the transmission module 123 is specifically configured to: when the handover response information sent by the network device corresponding to the target cell is ACK, send the handover instruction to the second communication node.

In an implementation, the handover request message further includes: the reference clock information of the source cell, where the reference clock information of the source cell is used for the network device corresponding to the candidate cell or the network device corresponding to the target cell to determine whether the handover response information is ACK.

In an implementation, when determining, according to the reference clock information sent by the network device corresponding to the at least one candidate cell, the target cell, the determination module is specifically configured to: determine a candidate cell whose clock accuracy is higher than a preset accuracy threshold or whose clock accuracy is the same as the clock accuracy of the source cell as the target cell.

In an implementation, in the case that the determination module determines that the clock accuracy of the at least one candidate cell is lower than the preset accuracy threshold or is lower than the clock accuracy of the source cell, or in the case that the determination module determines that the clock accuracy of the at least one candidate cell is different from the preset accuracy threshold or is different from the clock accuracy of the source cell, when determining, according to the reference clock information sent by the network device corresponding to the at least one candidate cell, the target cell, the determination module is specifically configured to perform at least one of the following steps: determining, in the at least one candidate cell, a cell whose channel quality is greater than a preset quality threshold as the target cell; determining, according to a pre-configuration, the target cell; determining, among the at least one candidate cell, the cell with the highest clock accuracy as the target cell; determining that the handover fails.

In an implementation, in the case that the designated node is a terminal device connected to the first communication node, the transmission module 123 is specifically configured to send measurement configuration information to the terminal device, where the measurement configuration information is used to instruct the terminal device to acquire reference clock information of at least one candidate cell;

the determination module is specifically configured to: determine, according to the measurement result fed back by the terminal device, the target cell; the transmission module 123 is further configured to: send a handover request message to the target cell, where the handover request message is used to request the network device corresponding to the target cell to feed back handover response information of handing over the terminal device from the source cell to the target cell; send a handover instruction to the terminal device when it is determined that the received handover response information is ACK, where the handover instruction is used to instruct the terminal device to be handed over from the connection to the first communication node to the connection to the network device corresponding to the target cell.

In an implementation, the measurement configuration information includes an indication message, where the indication message is used to instruct the terminal device to feed back the reference clock information of the at least one candidate cell.

In an implementation, the measurement configuration information includes an indication message, where the indication message is used to instruct the terminal device to feed back a candidate cell, among the at least one candidate cell, whose clock accuracy is higher than the preset accuracy threshold or whose clock accuracy is the same as the clock accuracy of the source cell; or the indication message is used to instruct the terminal device to feed back the reference clock information of a candidate cell, among the at least one candidate cell, whose clock accuracy is higher than the preset accuracy threshold or whose clock accuracy is the same as the clock accuracy of the source cell.

In an implementation, the reference clock information includes at least one of the following: reference clock information of time sensitive networking TSN clock, reference clock information of time sensitive conveying TSC clock, and reference clock information of a high-accuracy clock whose time accuracy meets a preset time accuracy threshold.

In an implementation, the reference clock information includes at least one of the following: reference system frame number SFN, TSC domain index, TSN domain index, time, clock accuracy value, indication formation of a clock accuracy type, tine information typet, and uncertainty.

In an implementation, the first communication node includes at least: a source network device corresponding to the source cell; the second communication node includes at least: the terminal device.

In an implementation, the handover instruction includes reference clock information of the target cell.

In an implementation, the transmission module 123 is further configured to: after the determination module determines the target cell that meets the preset condition, send a RRC message to the second communication node, where the RRC message includes the reference clock information of the target cell.

Figure 13:
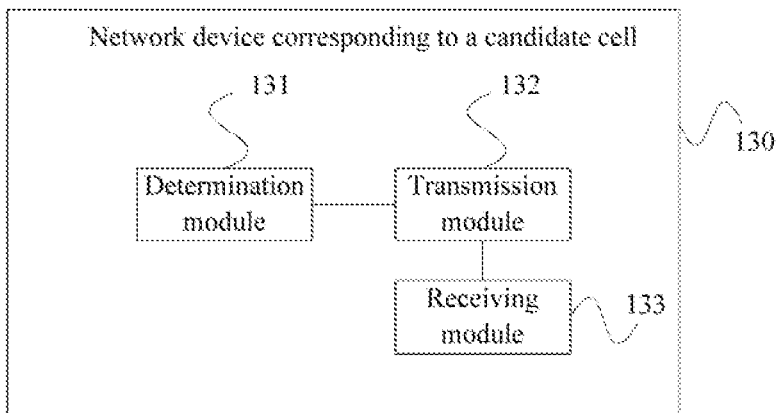
FIG. 13 is a schematic structural diagram of a network device corresponding to a candidate cell provided by the present application.

FIG. 13 is a schematic structural diagram of a network device corresponding to a candidate cell provided by the present application. As shown in FIG. 13, the network device 130 corresponding to the candidate cell includes:

a determination module 131, configured to determine reference clock information sent to a first communication node;

a transmission module 132, configured to send the reference clock information to the first communication node, where the reference clock information is used for the first communication node to determine a target cell that meets a preset condition, and initiate a handover process of handing over a second communication node from a source cell to the target cell, where the second communication node is connected to the first communication node, and the first communication node belongs to the source cell.

The network device corresponding to the candidate cell provided in the present embodiment is used to perform the technical solution on the network device side corresponding to the candidate cell according to any of the above method embodiments, and the implementation principle and the technical effect thereof are similar to those of the network device corresponding to the candidate cell according to any of the above method embodiments, which will not be repeated herein.

Further, the network device further includes: a receiving module 133, configured to receive an indication message from the first communication node before the transmission module sends the reference clock information to the first communication node, where the indication message is used to instruct the network device corresponding to the candidate cell to send the reference clock information of the candidate cell.

In an implementation, when receiving the indication message from the first communication node, the receiving module is specifically configured to: receive a handover request message from the first communication node, where the handover request message is used to request the network device corresponding to the candidate cell to send handover response information of handing over the second communication node from the source cell to the candidate cell; in the case that the handover response information sent by the network device corresponding to the candidate cell is ACK, receive the indication message from the first communication node.

In an implementation, when receiving the indication message from the first communication node, the receiving mode is specifically configured to: receive the handover request message from the first communication node, where the handover request message includes the indication message; when sending the reference clock information to the first communication node, the transmission node is specifically configured to: send, to the first communication node, handover response information of handing over the second communication node from the source cell to the candidate cell, where the handover response information includes the reference clock information.

In an implementation, in the case that the candidate cell is the target cell that meets the preset condition determined by the first communication node, the receiving module is further configured to: receive the handover request message from the first communication node, where the handover request message is used to request the network device corresponding to the candidate cell to send the handover response information of handing over the second communication node from the source cell to the candidate cell.

In an implementation, the handover request message further includes: the reference clock information of the source cell, where the reference clock information of the source cell is used for the network device corresponding to the candidate cell to determine whether the handover response information is ACK.

In an implementation, the reference clock information includes at least one of the following: reference clock information of Time Sensitive Network TSN clock, reference clock information of Time Sensitive Conveying TSC clock, and reference clock intimation of a high-accuracy clock whose clock accuracy meets a preset time accuracy threshold.

In an implementation, the reference clock information includes at least one of the following: reference system frame number SFN, TSC domain index, TSN domain index, time, clock accuracy value, indication formation of a clock accuracy type, time information type, and uncertainty.

In an implementation, the first communication node at least includes: a source network device corresponding to the source cell; the second communication node at least includes: the terminal device.

Figure 14:
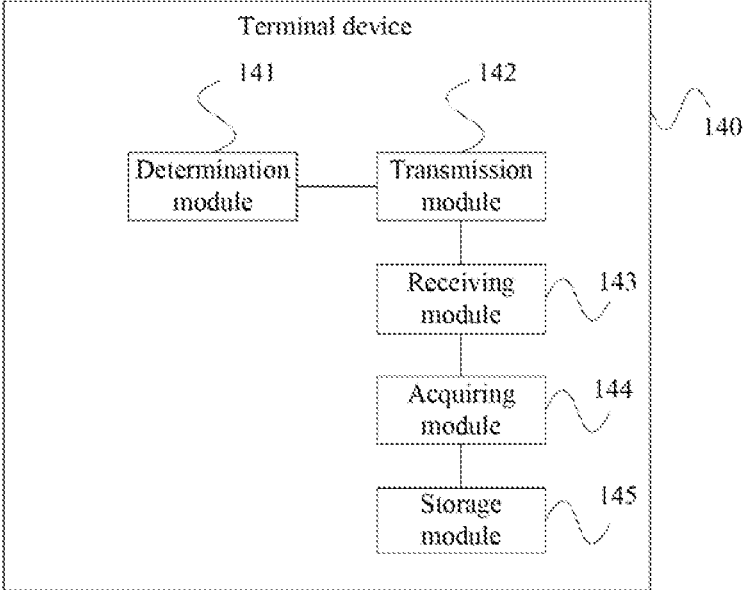
FIG. 14 is a schematic structural diagram of a terminal device provided by the present application.

FIG. 14 is a schematic structural diagram of a terminal device provided by the present application. As shown in FIG. 14, the terminal device 140 includes: a determination module 141 and a transmission module 142, where the determination module 141 is configured to determine reference clock information sent to a first communication node; the transmission module 142 is configured to send the reference clock information to the first communication node, where the reference clock information is used for the first communication node to determine a target cell that meets a preset condition and initiate a handover process of handing over the second communication node from a source cell to the target cell, where the second communication node is connected to the first communication node, and the first communication node belongs to the source cell.

The terminal device provided in the present embodiment is configured to perform the technical solution of the terminal device side according to any of the above method embodiments, the implementation principle and the technical effect thereof are similar to those of the terminal device according to any of the above method embodiments, which will not be repeated herein.

On the basis of the embodiment shown in the foregoing FIG. 14, the terminal device further includes: a receiving module 143 and a requiring module 144; where the receiving module 143 is configured to receive measurement configuration information from the first communication node before the transmission module sends the reference clock information to the first communication node; the requiring module 144 is configured to require reference clock information of at least one candidate cell according to the measurement configuration information.

In an implementation, the measurement configuration information includes an indication message, where the indication message is used to instruct the terminal device to feed back the reference clock information of the at least one candidate cell; when sending the reference clock information to the first communication node, the transmission module is specifically configured to: send a measurement result to the first communication node, where the measurement result includes the reference clock information of the at least one candidate cell.

In an implementation, the measurement configuration information includes an indication message, where the indication message is used to instruct the terminal device to feed back a candidate cell, among the at least one candidate cell, whose clock accuracy is higher than a preset accuracy threshold or whose clock accuracy is the same as the clock accuracy of the source cell; or the indication message is used to instruct the terminal device to feed back reference clock information of the candidate cell, among the at least one candidate cell, whose clock accuracy is higher than the preset accuracy threshold or whose clock accuracy is the same as the clock accuracy of the source cell; when sending the reference clock information to the first communication node, the transmission module is specifically configured to: send the measurement result to the first communication node, where the measurement result includes the reference clock information of the candidate cell, among the at least one candidate cell, whose clock accuracy is higher than the preset accuracy threshold or whose clock accuracy is the same as the clock accuracy of the source cell.

In an implementation, when requiring the reference clock information of at least one candidate cell, the requiring module is specifically configured to: read system information of the at least one candidate cell, and require, from the system information, the reference clock information of the at least one candidate cell.

In an implementation, the receiving module is further configured to: after the transmission module sends the measurement result to the first communication node, receive a handover instruction from the first communication node, where the handover instruction is used to instruct the terminal device to be handed over from a connection to the first communication node to a connection to a network device corresponding to the target cell.

In an implementation, the terminal device further includes: a storage module 145, configured to store the reference clock information of the at least one candidate cell, after the requiring module reads the system information of the at least one candidate cell and requires the reference clock information of the at least one candidate cell from the system information, where the reference clock information of the at least one candidate cell is used for at least one of the following: measurement reporting by the terminal device to the first communication node, synchronization between the terminal device and the network device corresponding to the target cell, service transmission between the terminal device and the network device corresponding to the target cell.

Figure 15:
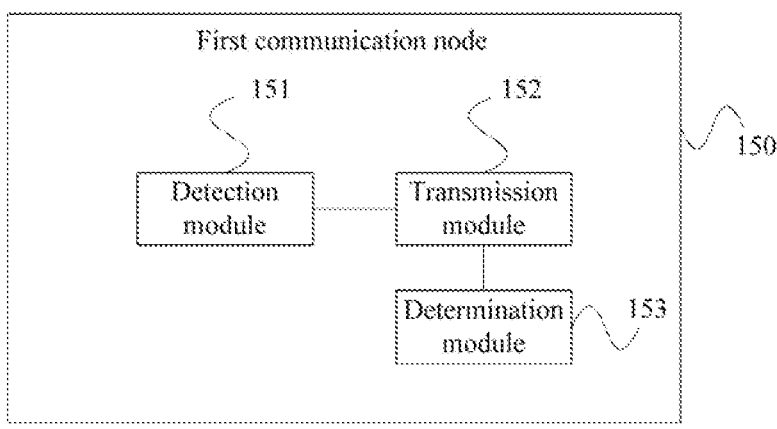
FIG. 15 is a schematic structural diagram of a first communication node provided by the present application.

FIG. 15 is a schematic structural diagram of a first communication node provided by the present application. As shown in FIG. 15, the first communication node 150 includes: a detection module 151 and/or a transmission module 152, and a determination module 153; where the detection module 151 is configured to detect the locally saved reference clock information; the transmission module 152 is configured to send the first request message to a third communication node, where the first request message is used to request the third communication node to feed back reference clock information; the determination module 153 is used to determine, according to the required reference clock information, a target cell that meets a preset condition, and initiate a handover process of handing over a second communication node from a source cell to the target cell, where the first communication node belongs to the source cell, and the second communication node is connected to the first communication node.

In an implementation, the reference clock information is the reference clock information of neighboring cells of the source cell; when determining the target cell that meets the preset condition, the determination module is specifically configured to: determine a cell, among the neighboring cells, whose clock accuracy is higher than a preset accuracy threshold or whose clock accuracy is the same as the clock accuracy of the source cell as the target cell.

In an implementation, the reference clock information is the reference clock information of at least one candidate cell in the neighboring cells of the source cell; when determining the target cell that meets the preset condition, the determination module is specifically configured to: determine a candidate cell, among the at least one candidate cell, whose clock accuracy is higher than the preset accuracy threshold or whose clock accuracy is the same as the clock accuracy of the source cell as the target cell.

In an implementation, when the first communication node initiates the handover process of handing over the second communication node from the source cell to the target cell, the transmission module is specifically configured to send a second request message to a fourth communication node, where the second request message is used to request the fourth communication node to feed back a handover response information of handing over the second communication node from the source cell to the target cell, and the fourth communication node belongs to the target cell; when it is determined that the received handover response information is ACK, the transmission module sends a handover instruction to the second communication node, where the handover instruction is used to instruct the second communication node to hand over from a connection to the first communication node to a connection to the fourth communication node.

In an implementation, the reference clock information includes at least one of the following: reference clock information of Time Sensitive Network TSN clock, reference clock information of Time Sensitive Conveying TSC clock, and reference clock information of a high-accuracy clock whose time accuracy meets a preset time accuracy threshold.

In an implementation, the reference clock information includes at least one of the following: reference system frame number SFN, TSC domain index, TSN domain index, time, clock accuracy value, indication formation of a clock accuracy type, time information type, and uncertainty.

In an implementation, the first communication node at least includes: a source network device corresponding to the source cell; the second communication node at least includes: the terminal device; the third communication node includes at least one of: an operation maintenance management (OAM), an access and mobility management function (AMF) entity, and a network element of central network control (CNC) element.

In an implementation, the handover instruction includes reference clock information of the target cell.

In an implementation, after the determination module determines the target cell that meets the preset condition, the transmission module 123 is further configured to: send a RRC message to the second communication node, where the RRC message includes the reference clock information of the target cell.

Figure 16:
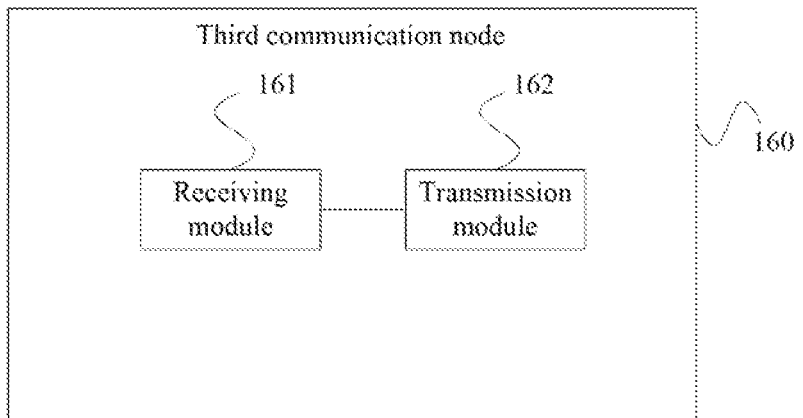
FIG. 16 is a schematic structural diagram of a third communication node provided by the present application.

FIG. 16 is a schematic structural diagram of a third communication node provided by the present application. As shown in FIG. 16, the third communication node 160 includes: a receiving module 161 and a transmission module 162; where the receiving module 161 is configured to receive a first request message sent by a first communication node, where the first request message is used to request the third communication node to feed back reference clock information, the reference clock information is used for the first communication node to determine a target cell that meets a preset condition and initiate a handover process of handing over the second communication node from a source cell to the target cell, where the first communication node belongs to the source cell, and the second communication node is connected to the first: communication node; the transmission module 162 is configured to send the feedback reference clock information to the first communication node.

In an implementation, the reference clock information includes at least one of the following: reference clock information of Time Sensitive Network TSN clock, reference clock information of Time Sensitive Conveying TSC clock, reference clock information of a high-accuracy clock whose time accuracy meets a preset time accuracy threshold.

In an implementation, the reference clock information includes at least one of the following: reference system frame number SFN, TSC domain index, TSN domain index, time, clock accuracy value, indication formation of a clock accuracy type, time information type, and uncertainty.

In an implementation, the first communication node at least includes: a source network device corresponding to the source cell; the second communication node at least includes: the terminal device; the third communication node includes at least one of: an operation maintenance management (OAM), an access and mobility management function (AMF) entity, and a CNC network element.

Figure 17:
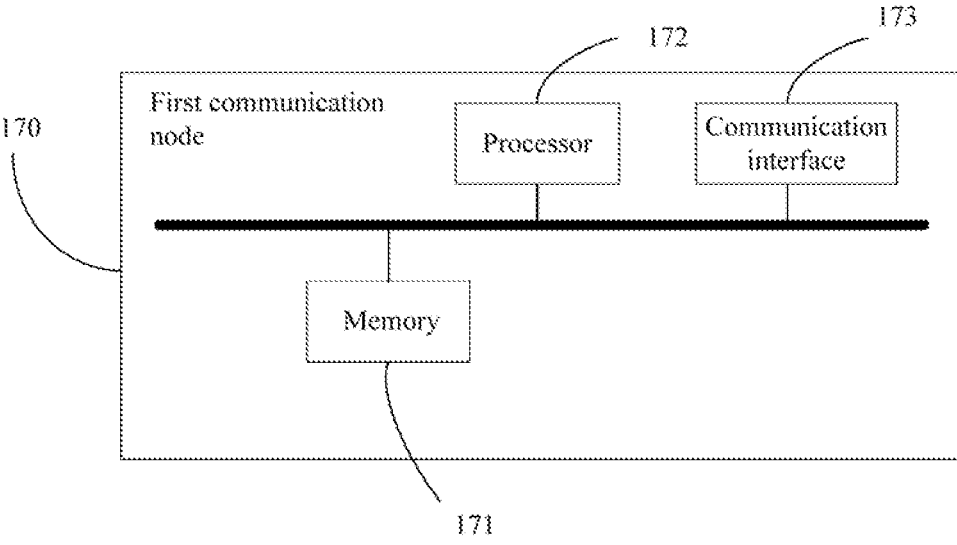
FIG. 17 is another schematic structural diagram of a first communication node provided by the present application.

FIG. 17 is another schematic structural diagram of a first communication node provided by the present application. As shown in FIG. 17, the first communication node 170 includes:

a processor 172, a memory 171 and a communication interface 173; where the memory 171 stores computer-executable instructions;

the processor 172 executes the computer-executable instructions stored in the memory 171, so that the processor 172 performs the technical solution on the first communication node side according to any of the above method embodiments.

FIG. 17 is a simple design of the first communication node, embodiments of the present application do not limit the number of processors and memories in the first communication node, and FIG. 17 only takes the number of 1 as an example for illustration.

Figure 18:
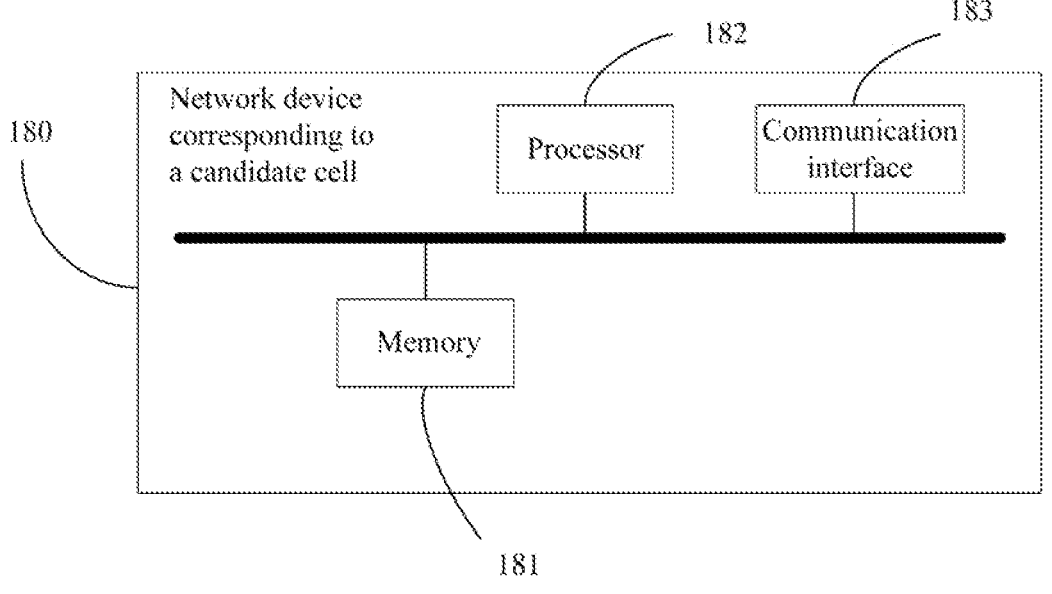
FIG. 18 is another schematic structural diagram of a network device corresponding to a candidate cell provided by the present application.

FIG. 18 is another schematic structural diagram of a network device corresponding to a candidate cell provided by the present application. As shown in FIG. 18, the network device 180 corresponding to the candidate cell includes:

a processor 182, a memory 181 and a communication interface 183; where the memory 181 stores computer-executable instructions;

the processor 182 executes the computer-executable instructions stored in the memory 181, so that the processor 182 performs the technical solution on the network device side corresponding to the candidate cell according to any of the above method embodiments.

FIG. 18 is a simple design of the network device corresponding to the candidate cell, embodiments of the present application do not limit the number of processors and memories in the network device corresponding to the candidate cell, and FIG. 18 only takes the number of 1 as an example for illustration.

Figure 19:
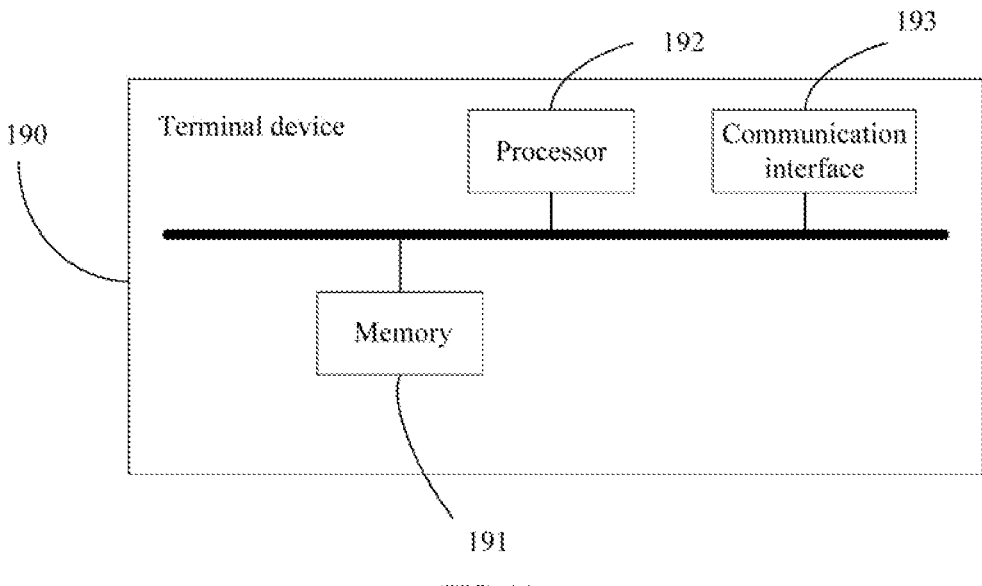
FIG. 19 is another schematic structural diagram of terminal device provided by the present application.

FIG. 19 is another schematic structural diagram of a terminal device provided by the present application. As shown in FIG. 19, the terminal device 190 includes:

a processor 192, a memory 191, and a communication interface 193; where the memory 191 stores computer-executable instructions;

the processor 192 executes the computer executed instructions stored in the memory 191, so that the processor 192 performs the technical solution on the terminal device side according to any of the above method embodiments.

FIG. 19 is a simple design of the terminal device, embodiments of the present application do not limit the number of processors and memories in the terminal device, and FIG. 19 only takes the number of 1 as an example for illustration.

Figure 20:
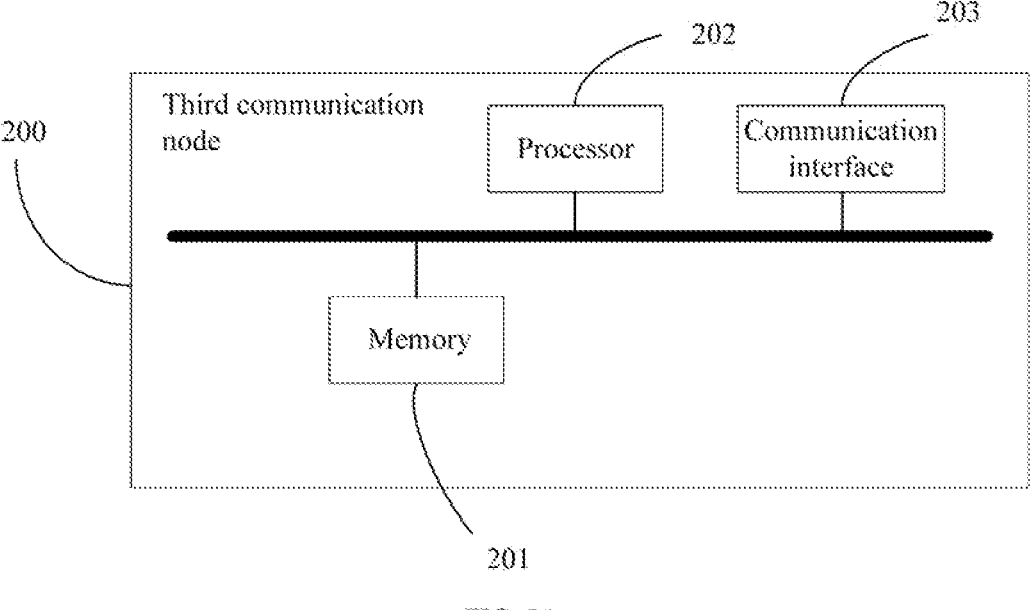
FIG. 20 is another schematic structural diagram of a third communication node provided by the present application.

FIG. 20 is another schematic structural diagram of a third communication node provided by the present application. As shown in FIG. 20, the third communication node 200 includes:

a processor 202, a memory 201, and a communication interface 203; where the memory 201 stores computer-executable instructions;

the processor 202 executes the computer-executable instructions stored in the memory 201, so that the processor 202 performs the technical solution on the third communication node side according to any of the above method embodiments.

FIG. 20 is a simple design of the third communication node, embodiments of the present application do not limit the number of processors and memories in the third communication node, and FIG. 20 only takes the number of 1 as an example for illustration.

The embodiment of the present application further provides a computer-readable storage medium, and the computer-readable storage medium has stored thereon computer-executable instructions, which when executed by a processor, causes the management method for cell handover according to any of the above method embodiments to be implemented.

The embodiment of the present application further provides a chip, including: a processor, configured to call and run a computer program from a memory, so that a device installed with the chip performs the management method for cell handover according to any of the above method embodiments.

The embodiment of the present application further provides a computer program product, including computer program instructions, and the computer program instructions cause a computer to perform the management method for cell handover according to any of the above method embodiments.

The embodiment of the present application further provides a computer program, and the computer program enables a computer to perform the management method for cell handover according to any of the above method embodiments.

In the several embodiments provided by the present application, it should be understood that the disclosed device and method may be implemented in other ways. For example, the device embodiments described above are merely illustrative. For example, the division of the modules is only a logical function division, and there may be other divisions in actual implementation. For example, multiple modules may be combined or be integrated into another system, or some features can be ignored or not implemented. In addition, mutual coupling or direct coupling or communication connection shown or discussed herein may be an indirect coupling or communication connection through some interfaces and modules, and may be in electrical, mechanical or other forms.

In the specific implementations of the above-described terminal device and network device, it should be understood that the processor may be a central processing unit (CPU), it may also be other general-purpose processor, a digital signal processor (DSP), an application specific integrated circuit (ASIC), etc. The general-purpose processor may be a microprocessor or the processor may also be any conventional processor or the like. The steps of the method disclosed in the present application can be directly embodied as being executed and completed by a hardware processor, or executed and completed using a combination of hardware and software modules in the processor.

All or part of the steps implementing the above various method embodiments can be completed by a hardware related to program instructions. The above program can be stored in a readable memory. When executed, the program executes the steps including those of the above-described various method embodiments; while the above-described memory (storage medium) includes: a read-only memory (ROM), a RAM, a flash memory, a hard disk, a solid state driver, a magnetic tape, a floppy disk, an Optical discs and any combination thereof.

What is claimed is:

1. A method for cell handover, comprising:
sending, by a source network device, a handover request to a candidate device that corresponds to a candidate cell, the handover request including a clock-accuracy requirement of a service associated with a terminal device;
receiving, by the source network device, handover response information from the candidate device, the handover response information indicating whether the candidate cell satisfies the clock-accuracy requirement, and, on a condition that the clock-accuracy requirement is satisfied, including reference clock information of the candidate cell;
determining, by the source network device, according to the reference clock information, a target cell based on a clock accuracy of the target cell; and
initiating a handover of a terminal device from a source cell to the target cell.

2. The method of claim 1, wherein before the receiving, by the source network device, the reference clock information from the candidate device, the method further comprises:
sending, by the source network device, an indication message to the candidate device, wherein the indication message is configured to instruct the candidate device to send reference clock information of a cell corresponding to the candidate device.

3. The method of claim 2, further comprising:
sending, by the source network device, the indication message to the candidate device, wherein the indication message is used to instruct the candidate device to send reference clock information corresponding to the candidate cell;
determining, by the source network device, according to the reference clock information sent by the candidate device, the target cell; and
sending, by the source network device, a handover instruction to the terminal device to instruct the terminal device to hand over from the source network device to a network device corresponding to the target cell.

4. The method of claim 3, wherein the sending, by the source network device, the indication message to the candidate device, comprises:
sending, by source network device, a handover request message to the candidate device to request the candidate device to send handover response information of handing over the terminal device from the source cell to the candidate cell, wherein the handover response information is an Acknowledge Character (ACK).

5. The method of claim 4, wherein the handover request message further comprises reference clock information of the source cell, wherein the reference clock information of the source cell is used for the candidate device or for the network device corresponding to the target cell to determine whether the handover response information is ACK.

6. The method of claim 5, further comprising determining that a clock accuracy of the candidate cell is lower than a preset accuracy threshold, is lower than a clock accuracy of the source cell, is different from the preset accuracy threshold, or is different from the clock accuracy of the source cell; and
the determining, by the source network device according to the reference clock information sent by the candidate device, the target cell, comprises at least one of:
determining, by the source network device, a cell whose channel quality is greater than a preset quality threshold among the at least one candidate cell as the target cell;
determining, by the source network device, the target cell according to a pre-configuration;
determining, by the source network device, a cell with the highest clock accuracy among the at least one candidate cell as the target cell; or
determining, by the source network device, that the handover fails.

7. The method of claim 3, wherein:
the sending, by the source network device, the indication message to the candidate device, comprises sending, by the source network device, a handover request message to the candidate device, wherein the handover request message comprises the indication message, and wherein a handover response information includes the reference clock information.

8. The method of claim 3, wherein after the determining, by the source network device, according to the reference clock information sent by the candidate device, the target cell, the method further comprises:
sending, by the source network device, a handover request message to the network device corresponding to the target cell, wherein the handover request message is used to request the network device corresponding to the target cell to send handover response information of handing over the terminal device from the source cell to the target cell;
wherein the sending, by the source network device, the handover instruction to the terminal device is based on the handover response information.

9. The method of claim 3, wherein the handover instruction includes the reference clock information of the target cell.

10. The method of claim 1, wherein the reference clock information comprises at least one of:
reference clock information of time sensitive networking (TSN) clock, reference clock information of time sensitive conveying (TSC) clock, or reference clock information of a high-accuracy clock whose time accuracy meets a preset time accuracy threshold.

11. The method of claim 1, wherein the reference clock information comprises at least one of:
reference system frame number (SFN), TSC domain index, TSN domain index, time, clock accuracy value, indication information of clock accuracy type, time information type, or uncertainty.

12. The method of claim 1, wherein after the determining, by the source network device, the target cell, the method further comprises:
sending, by the source network device, a radio resource control (RRC) message to the terminal device, wherein the RRC message includes the reference clock information of the target cell.

13. A non-transitory computer-readable storage medium having computer-executable instructions stored thereon that, when executed by a processor, are used to implement the method for cell handover of claim 1.

14. The method of claim 1, wherein the determining is further based on the clock accuracy of the target cell being higher than a preset accuracy threshold or the clock accuracy of the target cell being the same as a clock accuracy of the source cell.

15. The method of claim 1, wherein the handover response information includes an acknowledgement on the condition that the clock-accuracy requirement is satisfied and a negative acknowledgement otherwise, and the determining and the initiating are performed in response to the acknowledgement.

16. A method for cell handover, comprising:

receiving, by a candidate device corresponding to a candidate cell, a handover request from a source network device, the handover request including a clock-accuracy requirement of a service associated with a terminal device;

evaluating, by the candidate device, whether a clock accuracy of the candidate cell satisfies the clock-accuracy requirement;

on a condition that the clock-accuracy requirement is satisfied, sending, by the candidate device, handover response information comprising an acknowledgement and reference clock information of the candidate cell to the source network device; and on a condition that the clock-accuracy requirement is not satisfied, sending, by the candidate device, handover response information indicating a negative acknowledgement;

wherein the reference clock information is used for the source network device to determine a target cell based on a clock accuracy of the target cell and initiate a handover of the terminal device from a source cell to the target cell.

17. The method of claim 16, wherein the handover response information further includes an identification of a clock-accuracy type and a clock-accuracy value on the condition that the clock-accuracy requirement is satisfied.

18. A source network device, comprising:

a processor, a memory and a communication interface; wherein the memory stores computer-executable instructions;

the processor executes the computer-executable instructions stored in the memory, causing the source network device to:

send a handover request to a candidate device that corresponds to a candidate cell, the handover request including a clock-accuracy requirement of a service associated with a terminal device;

receive handover response information from the candidate device, the handover response information indicating whether the candidate cell satisfies the clock-accuracy requirement, and, on a condition that the clock-accuracy requirement is satisfied, include reference clock information of the candidate cell;

determine, according to the reference clock information, a target cell based on a clock accuracy of the target cell; and initiate a handover of a terminal device from a source cell to the target cell.

19. The source network device of claim 18, the target cell is further determined based on the clock accuracy of the target cell being higher than a preset accuracy threshold or the clock accuracy of the target cell being the same as a clock accuracy of the source cell.

20. The source network device of claim 18, wherein the handover response information includes an acknowledgement on the condition that the clock-accuracy requirement is satisfied and a negative acknowledgement otherwise, and the source network device performs the determining and the initiating in response to the acknowledgement.

* * * * *